United States Patent
Xian et al.

(10) Patent No.: US 12,199,875 B2
(45) Date of Patent: Jan. 14, 2025

(54) COMMUNICATION DEVICE, TRANSMISSION METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yuanjun Xian, Yokkaichi (JP); Takeshi Hagihara, Yokkaichi (JP); Makoto Mashita, Yokkaichi (JP); Yasuhiro Yabuuchi, Yokkaichi (JP); Tadashi Matsumoto, Yokkaichi (JP); Ichiro Kanda, Osaka (JP); Akihito Iwata, Osaka (JP); Takehiro Kawauchi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 536 days.

(21) Appl. No.: 17/273,056

(22) PCT Filed: Aug. 21, 2019

(86) PCT No.: PCT/JP2019/032579
§ 371 (c)(1),
(2) Date: Mar. 3, 2021

(87) PCT Pub. No.: WO2020/050025
PCT Pub. Date: Mar. 12, 2020

(65) Prior Publication Data
US 2021/0328931 A1 Oct. 21, 2021

(30) Foreign Application Priority Data
Sep. 3, 2018 (JP) .................................. 2018-164662

(51) Int. Cl.
*H04L 47/10* (2022.01)
*H04L 12/40* (2006.01)
(Continued)

(52) U.S. Cl.
CPC .............. *H04L 47/13* (2013.01); *H04L 12/40* (2013.01); *H04L 43/0882* (2013.01);
(Continued)

(58) Field of Classification Search
None
See application file for complete search history.

(56) References Cited

U.S. PATENT DOCUMENTS

2006/0171410 A1\* 8/2006 Jung ................. H04L 12/40143
370/395.42
2009/0296724 A1\* 12/2009 Matsunaga ......... H04L 12/2818
370/466
(Continued)

FOREIGN PATENT DOCUMENTS

JP H7-240756 A 9/1995
JP H9-326818 A 12/1997
(Continued)

OTHER PUBLICATIONS

International Search Report, Application No. PCT/JP2019/032579 mailed Nov. 5, 2019. ISA/Japan Patent Office.

*Primary Examiner* — Chirag G Shah
*Assistant Examiner* — Suk Jin Kang
(74) *Attorney, Agent, or Firm* — Honigman LLP; John Chau; Jonathan P. O'Brien

(57) ABSTRACT

In a relay device, a control unit detects simultaneous transmission of a plurality of data through a first communication
(Continued)

bus. When the number of times of detection of the simultaneous transmission within a predetermined time by the control unit is less than the predetermined number of times, a CAN communication unit starts transmission of data through the first communication bus. When the number of times of detection of the simultaneous transmission within the predetermined time by the control unit is equal to or greater than the predetermined number of times, an Ethernet communication unit transmits data through a first communication line.

9 Claims, 16 Drawing Sheets

(51) Int. Cl.
*H04L 43/0882* (2022.01)
*H04L 47/12* (2022.01)
*H04L 67/12* (2022.01)

(52) U.S. Cl.
CPC ............. *H04L 47/12* (2013.01); *H04L 67/12* (2013.01); *H04L 2012/40215* (2013.01); *H04L 2012/40273* (2013.01)

(56) References Cited

U.S. PATENT DOCUMENTS

| | | | |
|---|---|---|---|
| 2015/0124597 A1* | 5/2015 | Mabuchi | H04L 47/24 370/230 |
| 2015/0222455 A1 | 8/2015 | Ohtsuka et al. | |
| 2016/0135038 A1* | 5/2016 | Ochiai | G07C 5/008 370/338 |
| 2016/0359545 A1* | 12/2016 | Kodama | H04L 12/407 |
| 2018/0097887 A1* | 4/2018 | Koshimae | H04L 12/40013 |
| 2018/0255072 A1* | 9/2018 | Takada | H04L 63/1425 |
| 2018/0262527 A1* | 9/2018 | Jain | H04L 9/0838 |
| 2019/0007234 A1* | 1/2019 | Takada | H04L 12/40 |
| 2019/0095371 A1* | 3/2019 | Yoshino | H04L 12/40019 |
| 2019/0215153 A1* | 7/2019 | Han | H04L 9/3255 |
| 2020/0136857 A1* | 4/2020 | Yun | H04L 12/40039 |
| 2020/0137108 A1* | 4/2020 | Otsuka | H04L 63/1441 |
| 2020/0151132 A1* | 5/2020 | Kawashima | H04L 12/40189 |
| 2020/0192656 A1* | 6/2020 | Yamamoto | B60W 50/00 |
| 2020/0210167 A1* | 7/2020 | Ogawa | H04L 41/082 |
| 2021/0006432 A1* | 1/2021 | Krieger | H04L 12/6402 |
| 2021/0119819 A1* | 4/2021 | Sano | B60R 16/023 |
| 2021/0188201 A1* | 6/2021 | Haga | H04L 12/4625 |

FOREIGN PATENT DOCUMENTS

| | | |
|---|---|---|
| JP | H10-56470 A | 2/1998 |
| JP | 2000-295255 A | 10/2000 |
| JP | 2008-5290 A | 1/2008 |
| JP | 2015144353 A | 8/2015 |
| JP | 2017-5617 A | 1/2017 |
| JP | 2017-188793 A | 10/2017 |

* cited by examiner

COMMUNICATION DEVICE, TRANSMISSION METHOD, AND COMPUTER PROGRAM

CROSS-REFERENCE TO RELATED APPLICATIONS

This application is the U.S. national stage of PCT/JP2019/032579 filed on Aug. 21, 2019, which claims priority of Japanese Patent Application No. JP 2018-164662 filed on Sep. 3, 2018, the contents of which are incorporated herein.

TECHNICAL FIELD

The present disclosure relates to a communication device, a transmission method, and a computer program.

BACKGROUND

Japanese Patent Laid-Open Publication No. 2015-144353 discloses a communication system for a vehicle in which a plurality of communication devices transmit data to each other through a communication bus. In this communication system, communication through the communication bus is performed according to, for example, a CAN (Controller Area Network) protocol.

In communication according to the CAN protocol, each of the plurality of communication devices transmits main data by transmitting a data frame including the main data indicating the content of which a device as a transmission destination is to be notified. The data frame further includes sub-data indicating the priority relevant to transmission. When simultaneous transmission of a plurality of data frames through the communication bus is started, the transmission of a data frame having the highest priority among the plurality of data frames is continued. The transmission of the other data frames is stopped. The transmission of a low-priority data frame is restarted after the transmission of a high-priority data frame is completed.

In the communication system described in Japanese Patent Laid-Open Publication No. 2015-144353, when the communication load of the communication bus is large, the period required for transmitting the main data of a low-priority data frame is long. During a transmission period, the data frame is transmitted through the communication bus. The communication load of the communication bus is the percentage of the transmission period per unit period. When the communication load is large, processing based on the main data of the low-priority data frame may not be performed at an appropriate timing.

For example, it is assumed that a data frame including main data giving an instruction to open the window of a vehicle is transmitted in a situation in which the communication load is large. Here, when the priority of the data frame is low, the data frame is stagnant. It takes a long time to open the window, which may make the occupant feel uncomfortable.

Therefore, it is an object to provide a communication device, a transmission method, and a computer program in which the period required for transmitting data is short.

SUMMARY

A communication device according to an aspect of the present disclosure includes: a detection unit that detects simultaneous transmission of a plurality of data through a communication bus connected to a plurality of devices; a first transmission unit that starts transmission of data through the communication bus when the number of times of detection of the simultaneous transmission within a predetermined period is less than a predetermined number of times; and a second transmission unit that transmits data to one of the plurality of devices through a communication line different from the communication bus when the number of times of detection of the simultaneous transmission within the predetermined period is equal to or greater than the predetermined number of times.

A transmission method according to an aspect of the present disclosure includes: detecting simultaneous transmission of a plurality of data through a communication bus connected to a plurality of devices; transmitting data through the communication bus when the number of times of detection of the simultaneous transmission within a predetermined period is less than a predetermined number of times; and transmitting data to one of the plurality of devices through a communication line different from the communication bus when the number of times of detection of the simultaneous transmission within the predetermined period is equal to or greater than the predetermined number of times.

A computer program according to an aspect of the present disclosure detecting simultaneous transmission of a plurality of data through a communication bus connected to a plurality of devices; giving an instruction to transmit data through the communication bus when the number of times of detection of the simultaneous transmission within a predetermined period is less than a predetermined number of times; and giving an instruction to transmit data to one of the plurality of devices through a communication line different from the communication bus when the number of times of detection of the simultaneous transmission within the predetermined period is equal to or greater than the predetermined number of times.

In addition, not only can the present disclosure be realized as a communication device including such characteristic processing units, but also the present disclosure can be realized as a transmission method including such characteristic processes as steps or can be realized as a computer program causing a computer to execute such steps. In addition, the present disclosure can be realized as a semiconductor integrated circuit that realizes a part or the entirety of a communication device, or can be realized as a communication system including a communication device.

First, embodiments of the present disclosure will be listed and described. At least some of the embodiments described below may be arbitrarily combined.

A communication device according to an aspect of the present disclosure includes: a detection unit that detects simultaneous transmission of a plurality of data through a communication bus connected to a plurality of devices; a first transmission unit that starts transmission of data through the communication bus when the number of times of detection of the simultaneous transmission within a predetermined period is less than a predetermined number of times; and a second transmission unit that transmits data to one of the plurality of devices through a communication line different from the communication bus when the number of times of detection of the simultaneous transmission within the predetermined period is equal to or greater than the predetermined number of times.

In a communication device according to an aspect of the present disclosure, when the simultaneous transmission through the communication bus is started, a device as a transmission source of another data excluding one of a plurality of data transmitted simultaneously stops transmission of data.

In a communication device according to an aspect of the present disclosure, when the first transmission unit stops transmission of data through the communication bus, the second transmission unit transmits, through the communication line, data for which the first transmission unit has stopped the transmission.

In a communication device according to an aspect of the present disclosure, when the number of times by which the first transmission unit has stopped transmitting common data through the communication bus becomes equal to or greater than a second predetermined number of times, the second transmission unit transmits, through the communication line, the common data for which the first transmission unit has stopped the transmission. The second predetermined number of times is two or more.

In a communication device according to an aspect of the present disclosure, a protocol used for communication through the communication bus is different from a protocol used for communication through the communication line.

In a communication device according to an aspect of the present disclosure, the number of second transmission units is smaller than the number of devices that receive data from the first transmission unit through the communication bus.

A communication device according to an aspect of the present disclosure includes a reception unit that receives data from a second device different from the plurality of devices connected to the communication bus. The first transmission unit and the second transmission unit transmit the data received by the reception unit.

A transmission method according to an aspect of the present disclosure includes: detecting simultaneous transmission of a plurality of data through a communication bus connected to a plurality of devices; transmitting data through the communication bus when the number of times of detection of the simultaneous transmission within a predetermined period is less than a predetermined number of times; and transmitting data to one of the plurality of devices through a communication line different from the communication bus when the number of times of detection of the simultaneous transmission within the predetermined period is equal to or greater than the predetermined number of times.

A computer program according to an aspect of the present disclosure causes a computer to execute: detecting simultaneous transmission of a plurality of data through a communication bus connected to a plurality of devices; giving an instruction to transmit data through the communication bus when the number of times of detection of the simultaneous transmission within a predetermined period is less than a predetermined number of times; and giving an instruction to transmit data to one of the plurality of devices through a communication line different from the communication bus when the number of times of detection of the simultaneous transmission within the predetermined period is equal to or greater than the predetermined number of times.

In the communication device, the transmission method, and the computer program according to the aspect described above, when the number of times of simultaneous transmission through the communication bus within the predetermined period is large, the communication load of the communication bus is large. Therefore, data is transmitted through the communication line. For this reason, data is not stagnant for a long period of time. The period required for transmitting data is short.

In the communication device according to the aspect described above, when the simultaneous transmission of a plurality of data through the communication bus is started, the device as a transmission source of another data excluding one of a plurality of data transmitted simultaneously stops the transmission. The device as a transmission source of one of the plurality of data continues the transmission. As a result, appropriate communication is performed through the communication bus.

In the communication device according to the aspect described above, when the number of times of detection of the simultaneous transmission within the predetermined period is less than the predetermined number of times, the transmission of data through the communication bus is started. For example, in a case where the transmission of data through the communication bus is started, when simultaneous transmission is started, there is a possibility that the transmission of data through the communication bus is stopped. When the transmission of data through the communication bus is stopped, the data, transmission of which has been stopped, is transmitted through the communication line. Therefore, the time required for transmitting data is shorter.

In the communication device according to the aspect described above, when the number of times by which the transmission of the common data through the communication bus is stopped reaches the second predetermined number of times, the common data, transmission of which has been stopped, is transmitted through the communication line. Therefore, the frequency of transmitting the data through the communication bus is adjusted to an appropriate value.

In the communication device according to the aspect described above, in communication through the communication bus, for example, a CAN protocol is used. On the other hand, in communication through the communication line, for example, an Ethernet (registered trademark) protocol is used.

In the communication device according to the aspect described above, the number of high-performance devices connected to the communication bus and to the communication line is small. Therefore, the manufacturing cost is low.

In the communication device according to the aspect described above, the data received from the second device is transmitted to the device connected to the communication bus.

Advantageous Effect of the Present Disclosure

According to the present disclosure, the period required for transmitting data is short.

DETAILED DESCRIPTION OF PREFERRED EMBODIMENTS

Specific examples of communication systems according to embodiments of the present disclosure will be described below with reference to the diagrams. In addition, the present disclosure is not limited to these examples but is defined by the claims, and is intended to include all modifications within the meaning and scope equivalent to the claims.

Embodiment 1

Figure 1:
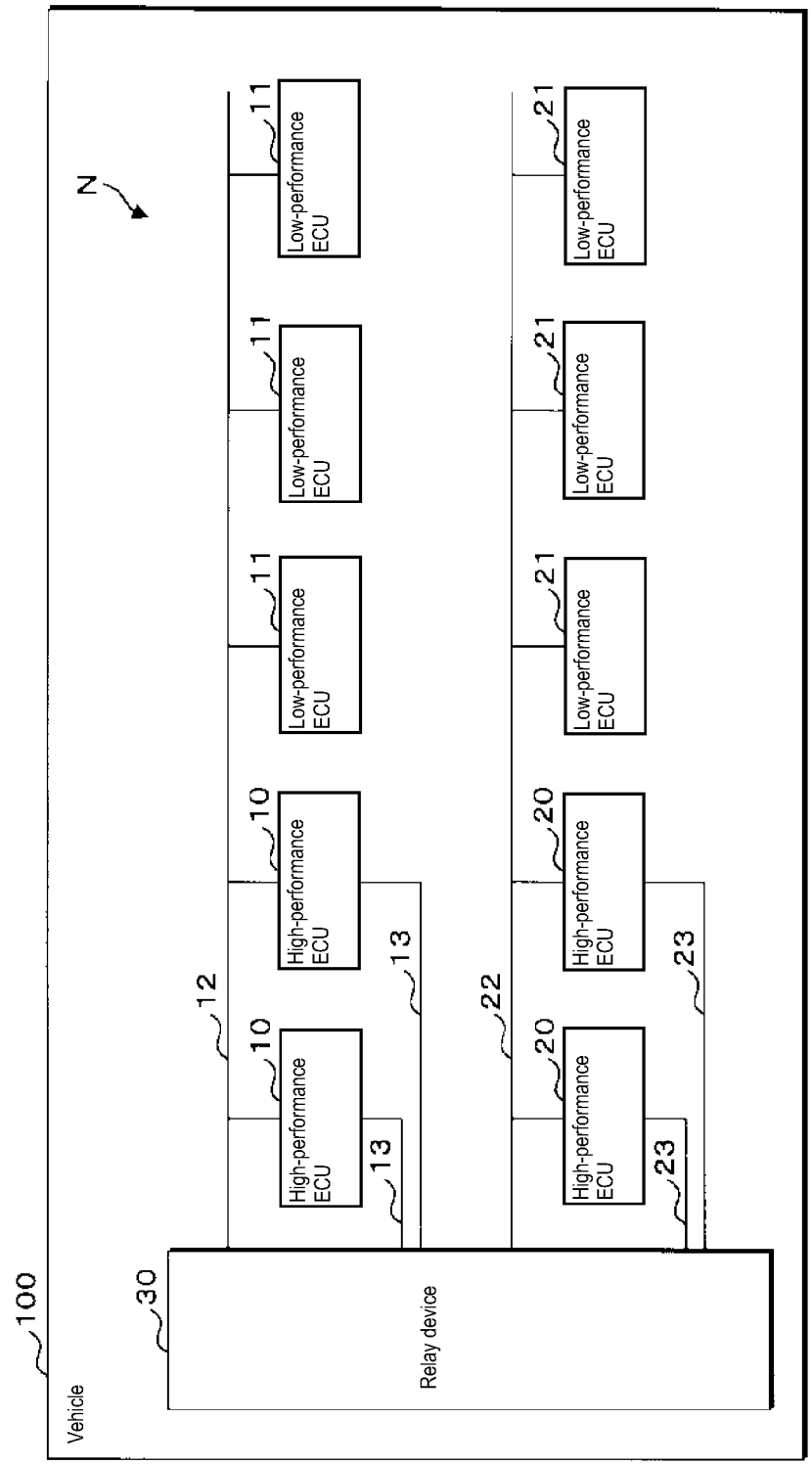
FIG. 1 is a block diagram showing the main configuration of a communication system according to Embodiment 1.

FIG. 1 is a block diagram showing the main configuration of a communication system N according to Embodiment 1. The communication system N is preferably mounted in a vehicle 100. The communication system N includes four high-performance ECUs (Electronic Control Units) 10 and 20, six low-performance ECUs 11 and 21, a first communication bus 12, two first communication lines 13, a second communication bus 22, two second communication lines 23, and a relay device 30.

The two high-performance ECUs 10 and the three low-performance ECUs 11 are connected to the first communication bus 12. The two high-performance ECUs 20 and the three low-performance ECUs 21 are connected to the second communication bus 22. The first communication bus 12 and the second communication bus 22 are further connected to the relay device 30. Each of the two high-performance ECUs 10 is further connected to the first communication line 13. Each of the two high-performance ECUs 20 is further connected to the second communication line 23. The relay device 30 is connected to the two first communication lines 13 and to the two second communication lines 23.

Each of the high-performance ECUs 10 and 20 and the low-performance ECUs 11 and 21 performs control related to an electric device mounted in the vehicle 100. The high-performance ECUs 10 and 20 and the low-performance ECUs 11 and 21 function as communication devices and communicate with one another. As a result, at least two of the four high-performance ECUs 10 and 20 and the six low-performance ECUs 11 and 21 perform cooperative operations.

For example, when a person touches the door knob of the vehicle 100, data that gives an instruction to unlock the door is input to the low-performance ECU 11. The low-performance ECU 11 transmits the data to the high-performance ECU 20. When the high-performance ECU 20 receives the data giving an instruction to unlock the door, the high-performance ECU 20 outputs the received data to a drive machine that drives a door motor for unlocking the door. As a result, the door is unlocked.

The relay device 30 transmits, to at least one of the two high-performance ECUs 10 and the three low-performance ECUs 11, the data which has been received from one of the two high-performance ECUs 20 and the three low-performance ECUs 21. Similarly, the relay device 30 transmits, to at least one of the two high-performance ECUs 20 and the three low-performance ECUs 21, the data which has been received from one of the two high-performance ECUs 10 and the three low-performance ECUs 11. The relay device 30 also functions as a communication device.

In the communication system N, main data is transmitted by transmitting a data frame including the main data indicating the content of which a device as a transmission destination is to be notified. The main data is, for example, data that gives an instruction to unlock the door. The data frame includes various kinds of sub-data in addition to the main data. There are, as sub-data, identification data, transmission source data, transmission destination data, or the like. The identification data is used for identifying the main data. The transmission source data indicates a device as a transmission source. The transmission destination data indicates a device as a transmission destination. The data frame is configured by a plurality of bit data, each of which indicates "1" or "0".

The two high-performance ECUs 10, the three low-performance ECUs 11, and the relay device 30 communicate with one another through the first communication bus 12. The data frame transmitted by one of the devices connected to the first communication bus 12 is received by all the devices connected to the first communication bus 12. Each of the two high-performance ECUs 10, the three low-performance ECUs 11, and the relay device 30 receives not only the data frames transmitted by another device but also the data frame transmitted by its own device.

In communication through the first communication bus 12, a CAN protocol is used. The first communication bus 12 is a twisted pair cable, and includes two twisted wires. Dominant is transmitted by adjusting the voltage difference between the two wires to a predetermined voltage exceeding 0 V. Recessive is transmitted by adjusting the voltage difference between the two wires to 0 V. When dominant and recessive are output simultaneously through the first communication bus 12, the potential difference between the two wires included in the first communication bus 12 is a predetermined voltage. The first communication bus 12 indicates dominant.

Dominant corresponds to "1" or "0" of bit data. When dominant corresponds to "1", recessive corresponds to "0". When dominant corresponds to "0", recessive corresponds to "1".

Hereinafter, it is assumed that dominant and recessive indicate "1" and "0", respectively. Therefore, when the bit data indicating "1" and the bit data indicating "0" are transmitted simultaneously, the bit data indicating "1" is received.

Figure 2:
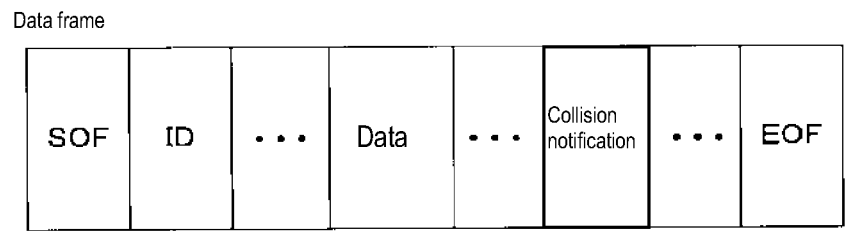
FIG. 2 is an explanatory diagram of a data frame for CAN.

FIG. 2 is an explanatory diagram of a data frame for CAN. In the data frame for CAN, a SOF (Start Of Frame) field, an ID (Identification Data) field, a data field, a collision notification field, an EOF (End Of Frame) field, and the like are provided. Main data is included in the data field. Sub-data is included in a field different from the data field.

The sub-data included in the SOF field and the sub-data included in the EOF field indicate the start and end of the data frame, respectively. The values of one or more bit data configuring the SOF field and the EOF field are common to all the data frames for CAN. The sub-data included in the ID field is identification data for identifying the main data included in the data field. The sub-data included in the ID field is configured by a plurality of bit data.

When simultaneous transmission of a plurality of data frames through the first communication bus 12 is started, arbitration is performed based on the sub-data included in the ID fields of the plurality of data frames. As a result, the device that is a transmission source of another data frame excluding one of the plurality of data frames transmitted simultaneously stops the transmission of the data frame.

The simultaneous transmission of a plurality of data frames means that a plurality of data frames are transmitted simultaneously. "Simultaneous" of simultaneous transmission indicates not only a state in which a plurality of points in time, at which a plurality of data frames are transmitted, completely match one another but also a state in which transmission of a plurality of data frames is started during a period of one bit data. The fact that simultaneous transmission is performed is called collision.

When the device connected to the first communication bus 12 transmits a data frame through the first communication bus 12, the device compares the value of the transmitted bit data with the value of the received bit data. As described above, when the bit data indicating "1" (dominant) and the bit data indicating "0" (recessive) are transmitted simultaneously, the bit data indicating "1" is received. Therefore, when the device connected to the first communication bus 12 receives the bit data indicating "1" even though the device has transmitted the bit data indicating "0", the device detects the collision of a plurality of data frames. The device that transmits the bit data indicating "1" does not detect the collision.

The device that detects the collision stops the transmission of the data frame through the first communication bus 12. Therefore, when simultaneous transmission of a plurality of data frames through the first communication bus 12 is started, that is, when a collision occurs, the device that is a transmission source of another data frame excluding one of the plurality of data frames transmitted simultaneously stops the transmission of the data frame. The device that is a transmission source of one of the plurality of data frames transmitted simultaneously continues the transmission. As a result, appropriate communication is performed through the first communication bus 12.

The above-described arbitration is performed while a plurality of bit data included in the ID field are transmitted. As described above, when the bit data indicating "1" and the bit data indicating "0" are transmitted simultaneously, the bit data indicating "1" is received. Therefore, assuming that the identification data included in the ID field is a binary value, the larger the value, the higher the priority relevant to the transmission of the data frame. The device that is a transmission source of the data frame having the highest priority among the plurality of data frames transmitted simultaneously continues the transmission. The device that is a transmission source of another data frame stops the transmission.

The collision notification field of the data frame for CAN shown in FIG. 2 is configured by one bit data. When the simultaneous transmission of a plurality of data frames through the first communication bus 12 is started, the device that has continued the transmission, transmits bit data indicating "0" (recessive) in the collision notification field of the data frame which is in transmission. The device that has stopped the transmission transmits bit data indicating "1" (dominant) in the collision notification field of the data frame transmitted by another device. At this time, the bit data in the collision notification field indicates "1" (dominant). As a result, all the devices connected to the first communication bus 12 are notified of the occurrence of a collision. These devices detect the collision.

When the number of data frames transmitted through the first communication bus 12 is 1, the bit data in the collision notification field indicates "0". As a result, all the devices connected to the first communication bus 12 are notified that no collision has occurred.

When each of the high-performance ECU 10, the low-performance ECU 11, and the relay device 30 receives a data frame through the first communication bus 12, each of the high-performance ECU 10, the low-performance ECU 11, and the relay device 30 determines whether or not the main data included in the data field of the received data frame is to be stored based on the identification data included in the ID field of the received data frame. Each of the high-performance ECU 10, the low-performance ECU 11, and the relay device 30 stores the main data when it is determined that the main data is to be stored. Each of the high-performance ECU 10, the low-performance ECU 11, and the relay device 30 ignores the received data frame when it is determined that the main data is not to be stored.

The two high-performance ECUs 20, the three low-performance ECUs 21, and the relay device 30 communicate with one another through the second communication bus 22. The communication through the second communication bus 22 is similar to the communication through the first communication bus 12. Therefore, in communication through the second communication bus 22, a CAN protocol is used. The second communication bus 22 is a twisted pair cable, and includes two twisted wires.

Also in the communication through the second communication bus 22, the data frame for CAN shown in FIG. 2 is used. When simultaneous transmission of a plurality of data frames through the second communication bus 22 is started, arbitration is performed in the similar manner as in the communication through the first communication bus 12. When simultaneous transmission of a plurality of data frames through the second communication bus 22 is started, the device that is a transmission source of another data frame excluding one of the plurality of data frames transmitted simultaneously stops the transmission of the data frame. The device that is a transmission source of one of the plurality of data frames transmitted simultaneously continues the transmission. As a result, appropriate communication is performed through the second communication bus 22. The sub-data included in the ID field indicates the priority relevant to the transmission of the data frame through the second communication bus 22.

When simultaneous transmission of a plurality of data frames through the second communication bus 22 is started, the bit data in the collision notification field of the data frame, transmission of which transmission has continued, indicates "1" (dominant) so that all the devices connected to the second communication bus 22 are notified of the occurrence of a collision. These devices detect collisions.

When each of the high-performance ECU 20, the low-performance ECU 21, and the relay device 30 receives a data frame through the second communication bus 22, each of the high-performance ECU 20, the low-performance ECU 21, and the relay device 30 determines whether or not the main data included in the data field of the received data frame is to be stored based on the identification data included in the ID field of the received data frame. Each of the high-performance ECU 20, the low-performance ECU 21, and the relay device 30 stores the main data when it is determined that the main data is to be stored. Each of the high-performance ECU 20, the low-performance ECU 21, and the relay device 30 ignores the received data frame when it is determined that the main data is not to be stored.

The relay device 30 communicates with the high-performance ECU 10 through the first communication line 13 and communicates with the high-performance ECU 20 through the second communication line 23. In communication through each of the first communication line 13 and the second communication line 23, an Ethernet (registered trademark) protocol is used, and a data frame for Ethernet is transmitted. The data frame for Ethernet includes not only the main data but also transmission source data and transmission destination data. The transmission source indicates the device as a transmission source of the data frame. The transmission destination data indicates the device as a transmission destination of the data frame.

The protocol used for communication through the first communication bus 12 is different from the protocol used for communication through the first communication line 13. Similarly, the protocol used for communication through the second communication bus 22 is different from the protocol used for communication through the second communication line 23.

The relay device 30 transmits a data frame to the high-performance ECU 10 through the first communication line 13, and transmits a data frame to the high-performance ECU 20 through the second communication line 23. The high-performance ECUs 10 and 20 transmits a data frame to the relay device 30 through the first communication line 13 and the second communication line 23, respectively.

When each of the high-performance ECU 10 and the relay device 30 receives the data frame through the first communication line 13, each of the high-performance ECU 10 and the relay device 30 stores the main data included in the received data frame. When each of the high-performance ECU 20 and the relay device 30 receives the data frame through the second communication line 23, each of the high-performance ECU 20 and the relay device 30 stores the main data included in the received data frame. The communication through each of the first communication line 13 and the second communication line 23 is one-to-one communication. Therefore, the number of devices connected to each of the first communication line 13 and the second communication line 23 is two.

The relay device 30 relays the transmission of the main data by transmitting the main data stored in its own device. Each of the high-performance ECUs 10 and 20 and the low-performance ECUs 11 and 21 performs control related to an electric device based on the main data stored in its own device.

Figure 3:
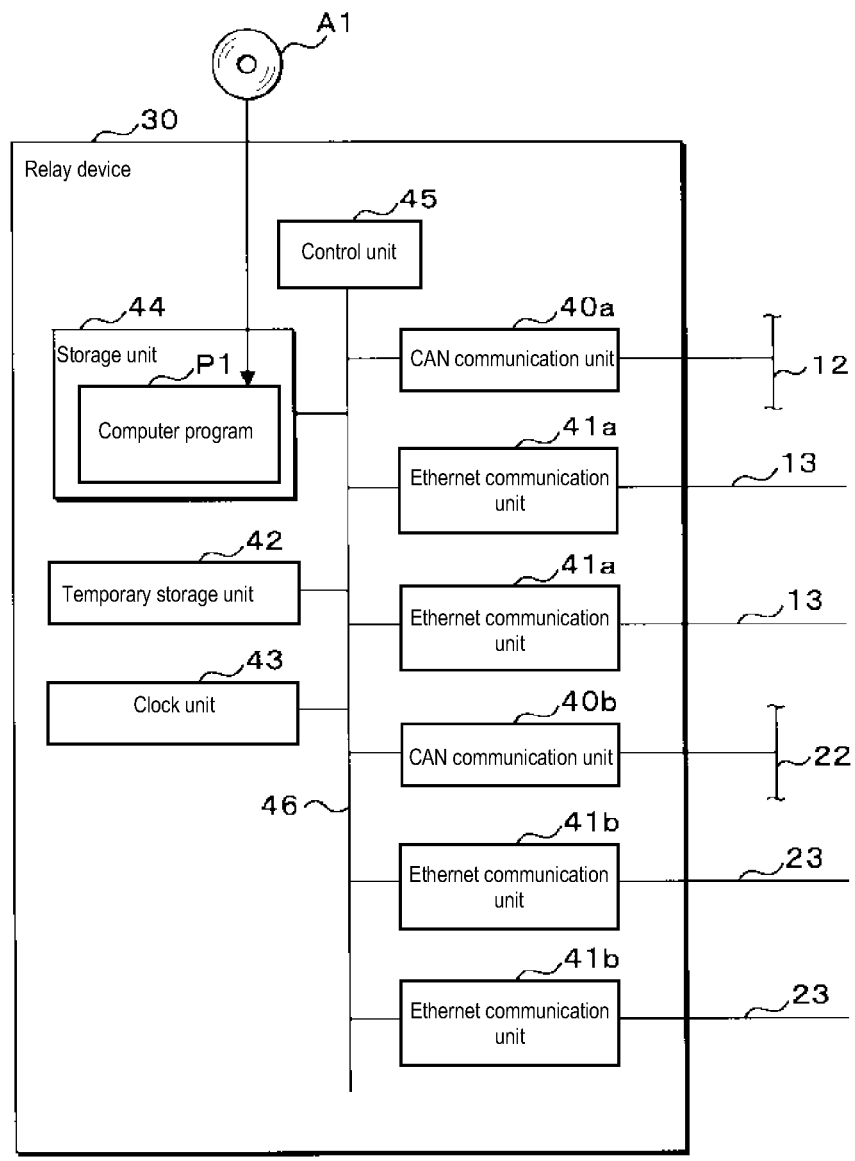
FIG. 3 is a block diagram showing the main configuration of a relay device.

FIG. 3 is a block diagram showing the main configuration of the relay device 30. The relay device 30 includes two CAN communication units 40a and 40b, four Ethernet communication units 41a and 41b, a temporary storage unit 42, a clock unit 43, a storage unit 44, and a control unit 45. These are connected to an internal bus 46 in the relay device 30. The CAN communication unit 40a is further connected to the first communication bus 12. The Ethernet communication unit 41a is further connected to the first communication line 13. The CAN communication unit 40b is further connected to the second communication bus 22. The Ethernet communication unit 41b is further connected to the second communication line 23.

The CAN communication units 40a and 40b and the Ethernet communication units 41a and 41b are interfaces, and transmit data frames according to the instruction of the control unit 45. Specifically, these sequentially transmit a plurality of bit data configuring the data frame.

The CAN communication unit 40a further transmits, according to the instruction of the control unit 45, bit data indicating "1" (dominant) in the collision notification field of the data frame transmitted through the first communication bus 12 by a device different from the relay device 30. The CAN communication unit 40b further transmits, according to the instruction of the control unit 45, bit data indicating "1" in the collision notification field of the data frame transmitted through the second communication bus 22 by a device different from the relay device 30.

The CAN communication unit 40a receives all the data frames transmitted through the first communication bus 12. The Ethernet communication unit 41a receives the data frame transmitted from the high-performance ECU 10 through the first communication line 13 connected to itself. The CAN communication unit 40b receives all the data frames transmitted through the second communication bus 22. The Ethernet communication unit 41b receives the data frame transmitted from the high-performance ECU 20 through the second communication line 23 connected to itself. The control unit 45 acquires the data frames received by the CAN communication units 40a and 40b and the Ethernet communication units 41a and 41b from these.

The control unit 45 stores the data in the temporary storage unit 42. Data is temporarily stored in the temporary storage unit 42. The data stored in the temporary storage unit 42 is read out from the temporary storage unit 42 by the control unit 45. The control unit 45 stores, in the temporary storage unit 42, relay data for relaying the transmission. In addition, the control unit 45 stores transmission stop count data in the temporary storage unit 42 so as to be associated with the relay data. The transmission stop count data indicates the number of times by which transmission has been stopped. The number of times indicated by the transmission stop count data indicates the number of times by which one of the CAN communication units 40a and 40b has stopped transmitting the relay data corresponding to itself.

The control unit 45 further stores first collision time data and second collision time data in the temporary storage unit 42. The first collision time data indicates the date and time when a collision occurs on the first communication bus 12. The second collision time data indicates the date and time when a collision occurs on the second communication bus 22. The data stored in the temporary storage unit 42 is deleted when the supply of power to the temporary storage unit 42 is stopped.

The control unit 45 acquires date and time data indicating the date and time from the clock unit 43. The date and time data acquired by the control unit 45 indicates the date and time when the date and time data is acquired.

The storage unit 44 is a non-volatile memory. A computer program P1 is stored in the storage unit 44. The control unit 45 includes one or more CPUs (Central Processing Units). One or more CPUs included in the control unit 45 execute the computer program P1 to perform a first relay data storage process, a second relay data storage process, a first relay data transmission process, and a second relay data transmission process in parallel.

The first relay data storage process is a process of storing, in the temporary storage unit 42 as relay data, the main data included in the data frame received by the CAN communication unit 40a and the Ethernet communication unit 41a. The second relay data storage process is a process of storing, in the temporary storage unit 42 as relay data, the main data included in the data frame received by the CAN communication unit 40b and the Ethernet communication unit 41b.

The first relay data transmission process is a process of transmitting the data frame through the first communication bus 12 or the first communication line 13. The second relay data transmission process is a process of transmitting the data frame through the second communication bus 22 or the second communication line 23.

The computer program P1 is used to cause one or more CPUs included in the control unit 45 to execute the first relay data storage process, the second relay data storage process, the first relay data transmission process, and the second relay data transmission process.

The computer program P1 may be stored in a storage medium A1 so as to be readable by one or more CPUs included in the control unit 45. In this case, the computer program P1 read out from the storage medium A1 by a reader (not shown) is stored in the storage unit 44. The storage medium A1 is an optical disk, a flexible disk, a magnetic disk, a magnetic optical disk, a semiconductor memory, or the like. The optical disk is a CD (Compact Disc)-ROM (Read Only Memory), a DVD (Digital Versatile Disc)-ROM, a BD (Blu-ray (registered trademark) Disc), or the like. The magnetic disk is, for example, a hard disk. The computer program P1 may be downloaded from an external device (not shown) connected to a communication network (not shown). The downloaded computer program P1 may be stored in the storage unit 44.

Figure 4:
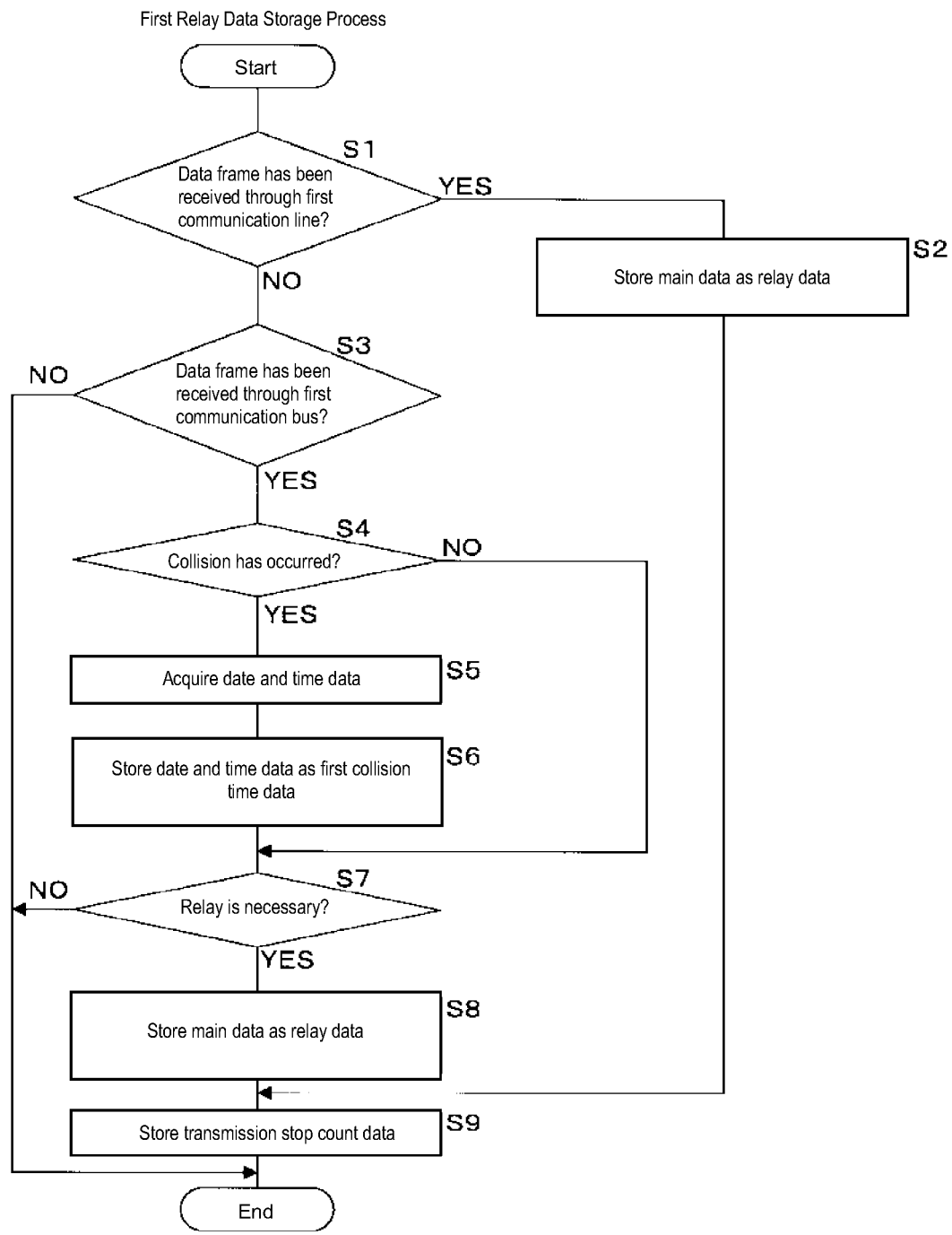
FIG. 4 is a flowchart showing the procedure of a first relay data storage process.

FIG. 4 is a flowchart showing the procedure of the first relay data storage process. The control unit 45 cyclically performs the first relay data storage process. First, the control unit 45 determines whether or not one of the two Ethernet communication units 41a has received a data frame through the first communication line 13 (step S1). When it is determined that a data frame has been received through the first communication line 13 (S1: YES), the control unit 45 stores, in the temporary storage unit 42 as relay data, the main data included in the data frame received by the Ethernet communication unit 41a (step S2).

When it is determined that no data frame has been received through the first communication line 13 (S1: NO), the control unit 45 determines whether or not the CAN communication unit 40a has received a data frame through the first communication bus 12 (step S3). When it is determined that no data frame has been received through the first communication bus 12 (S3: NO), the control unit 45 ends the first relay data storage process.

When it is determined that a data frame has been received through the first communication bus 12 (S3: YES), the control unit 45 determines whether or not a collision has occurred on the first communication bus 12 based on the value of the bit data included in the collision notification field of the data frame received by the CAN communication unit 40a (step S4). As described above, when a collision occurs, the bit data of the collision notification field indicates "1" (dominant). When no collision occurs, the bit data in the collision notification field indicates "0" (recessive). The occurrence of a collision on the first communication bus 12 means that simultaneous transmission of a plurality of data frames through the first communication bus 12 has been performed.

The control unit 45 executes step S4 so that the control unit 45 detects a collision on the first communication bus 12. The collision on the first communication bus 12 is simultaneous transmission of a plurality of data frames through the first communication bus 12. Specifically, the control unit 45 detects a collision when the bit data of the collision notification field indicates "1" (dominant). The control unit 45 functions as a deletion unit.

The simultaneous transmission detected by the control unit 45 in step S4 is not limited to the simultaneous transmission performed by the relay device 30 and at least one of the two high-performance ECUs 10 and the three low-performance ECUs 11. In step S4, the control unit 45 also detects simultaneous transmission performed by at least two of the two high-performance ECUs 10 and the three low-performance ECUs 11. As described above, the data frame transmitted by one of the devices connected to the first communication bus 12 is received by all the devices connected to the first communication bus 12. Therefore, it is possible to detect all simultaneous transmissions performed through the first communication bus 12.

When it is determined that a collision has occurred on the first communication bus 12, that is, when simultaneous transmission of a plurality of data frames through the first communication bus 12 is detected (S4: YES), the control unit 45 acquires date and time data from the clock unit 43 (step S5). Then, the control unit 45 stores the date and time data acquired in step S5 in the temporary storage unit 42 as first collision time data (step S6).

When it is determined that no collision has occurred on the first communication bus 12 (S4: NO) or after executing step S6, the control unit 45 determines whether or not relay of transmission is necessary for the main data included in the data frame received by the CAN communication unit 40a (step S7). A plurality of identification data corresponding to the main data, transmission of which needs to be relayed, are stored in the storage unit 44.

In step S7, when the identification data included in the ID field of the data frame received by the CAN communication unit 40a matches one of the plurality of identification data stored in the storage unit 44, the control unit 45 determines that relay is necessary. When the identification data included in the ID field of the data frame received by the CAN communication unit 40a does not match any of the plurality of identification data stored in the storage unit 44, the control unit 45 determines that relay is not necessary.

When it is determined that relay is not necessary (S7: NO), the control unit 45 ends the first relay data storage process. Thereafter, the control unit 45 ignores the data frame without performing the process relevant to the data frame received by the CAN communication unit 40a.

When it is determined that relay is necessary (S7: YES), the control unit 45 stores, in the temporary storage unit 42 as relay data, the main data included in the data field of the data frame received by the CAN communication unit 40a (step S8). After executing one of steps S2 and S8, the control unit 45 stores transmission stop count data so as to be associated with the relay data stored in the executed step of the steps S2 and S8 (step S9). At the time when step S9 is executed, the relay device 30 does not start transmitting the relay data stored in step S2 or step S8. Therefore, in step S9, the control unit 45 stores, in the temporary storage unit 42, transmission stop count data indicating zero as the number of transmission stops.

After executing step S9, the control unit 45 ends the first relay data storage process.

As described above, when no data frame is received through the first communication bus 12 or the first communication line 13, the control unit 45 repeatedly performs the first relay data storage process, and waits until a data frame is received through the first communication bus 12 or the first communication line 13. When the Ethernet communication unit 41a has received a data frame through the first communication line 13, the control unit 45 stores, as relay data, the main data included in the data frame received by the Ethernet communication unit 41a. The control unit 45 further stores transmission stop count data corresponding to the stored relay data in the temporary storage unit 42.

In a case where the CAN communication unit 40a has received a data frame through the first communication bus 12, when it is necessary to relay the transmission of the main data included in the data frame received by the CAN communication unit 40a, the control unit 45 stores the main data in the temporary storage unit 42 as relay data. In addition, the control unit 45 stores transmission stop count data corresponding to the stored relay data. When the simultaneous transmission of a plurality of data frames through the first communication bus 12 is detected, the control unit 45 stores first collision time data indicating the date and time when the simultaneous transmission is detected.

The control unit 45 cyclically performs the second relay data storage process. The content of the second relay data storage process is similar to the content of the first relay data storage process. In the description of the first relay data storage process, the high-performance ECU 10, the low-performance ECU 11, the first communication bus 12, the first communication line 13, the CAN communication unit 40a, the Ethernet communication unit 41a, and the first collision time data are replaced with the high-performance ECU 20, the low-performance ECU 21, the second communication bus 22, the second communication line 23, the CAN communication unit 40b, the Ethernet communication unit 41b, and the second collision time data, respectively. In this manner, it is possible to understand the second relay data storage process. The second collision time data indicates the date and time when a collision on the second communication bus 22 is detected.

When no data frame is received through the second communication bus 22 or the second communication line 23, the control unit 45 repeatedly performs the second relay data storage process, and waits until a data frame is received through the second communication bus 22 or the second communication line 23. When the Ethernet communication unit 41b has received a data frame through the second communication line 23, the control unit 45 stores, as relay data, the main data included in the data frame received by the Ethernet communication unit 41b. The control unit 45 further stores transmission stop count data corresponding to the stored relay data in the temporary storage unit 42.

In a case where the CAN communication unit 40b has received a data frame through the second communication bus 22, when it is necessary to relay the transmission of the main data included in the data frame received by the CAN communication unit 40b, the control unit 45 stores the main data in the temporary storage unit 42 as relay data. In addition, the control unit 45 stores transmission stop count data corresponding to the stored relay data. When the simultaneous transmission of a plurality of data frames through the second communication bus 22 is detected, the control unit 45 stores second collision time data indicating the date and time when the simultaneous transmission is detected.

Figure 5:
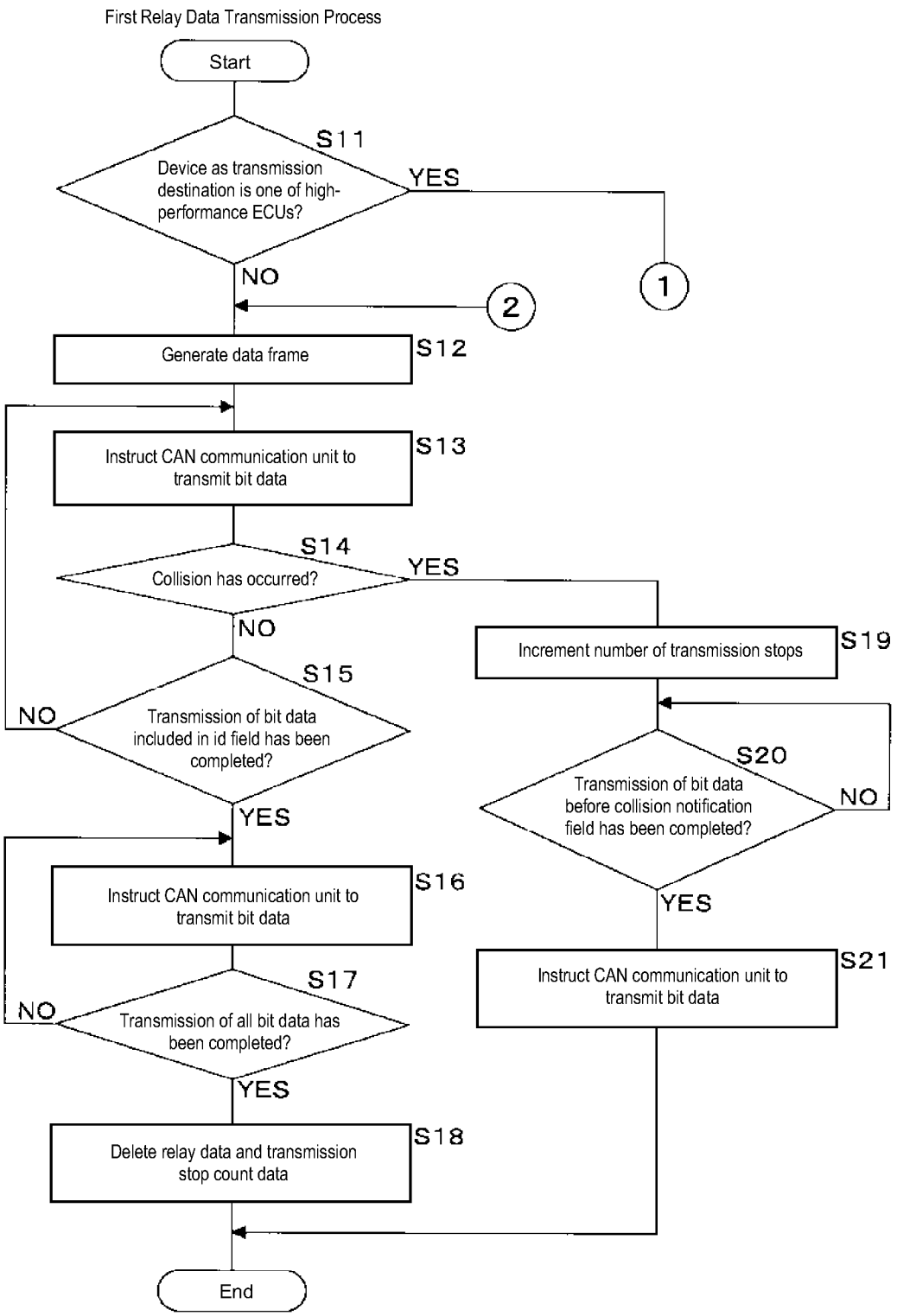
FIG. 5 is a flowchart showing the procedure of a first relay data transmission process.
Figure 6:
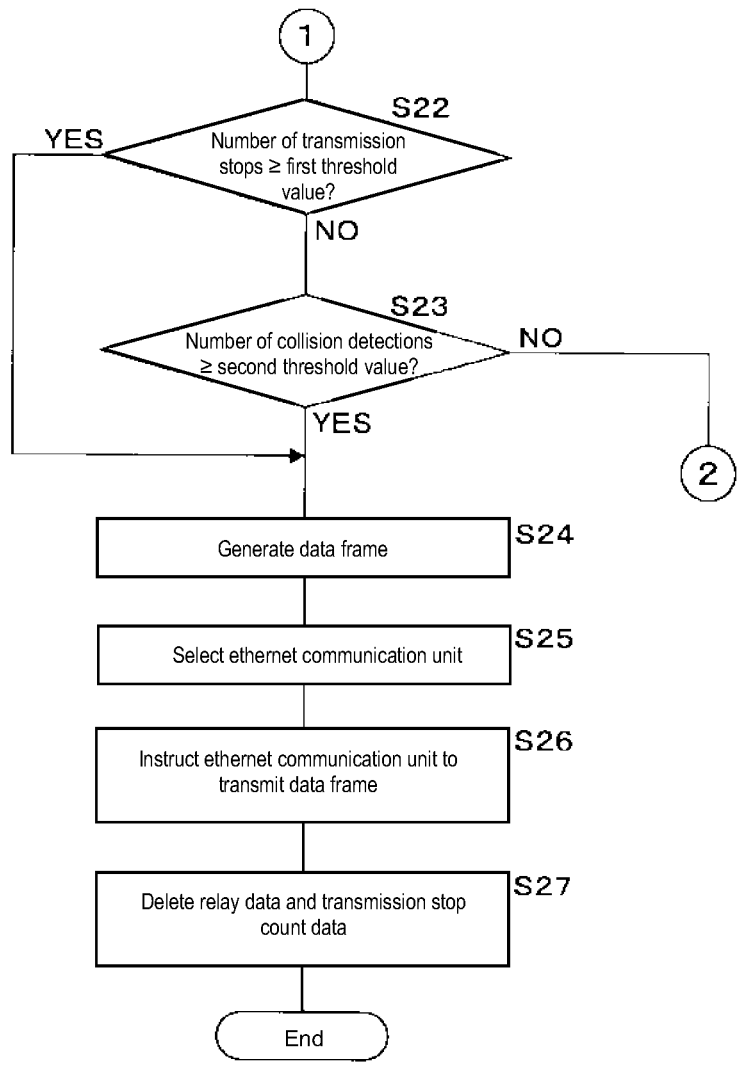
FIG. 6 is a flowchart showing the procedure of the first relay data transmission process.

FIGS. 5 and 6 are flowcharts showing the procedure of the first relay data transmission process. The control unit 45 performs the first relay data transmission process when relay data, the device as a transmission destination of which is one of the two high-performance ECUs 10 and the three low-performance ECUs 11 is stored in the temporary storage unit 42. The device as a transmission destination of relay data included in the data frame for CAN is determined based on the identification data included in the ID field of the data frame. The device as a transmission destination of relay data included in the data frame for Ethernet is a device indicated by the transmission destination data included in the data frame.

In the first relay data transmission process, the control unit 45 determines whether or not the device as a transmission destination of relay data to be transmitted is one of the two high-performance ECUs 10 (step S11). When it is determined that the device as a transmission destination is not one of the two high-performance ECUs 10 (S11: NO), the control unit 45 generates a data frame for CAN in which the relay data to be transmitted is included in the data field as main data (step S12).

Then, the control unit 45 instructs the CAN communication unit 40a to transmit one bit data of the data frame generated in step S12 (step S13). As a result, the CAN communication unit 40a transmits the bit data through the first communication bus 12. In the first relay data transmission process, the control unit 45 repeatedly performs step S13 so that the CAN communication unit 40a sequentially transmits a plurality of bit data configuring the data frame generated in step S12.

That is, in the first relay data transmission process, in step S13 of the first time, the control unit 45 causes the CAN communication unit 40a to transmit the first bit data of the data frame. In step S13 of the second time, the control unit 45 causes the CAN communication unit 40a to transmit the second bit data of the data frame. In this manner, the control unit 45 causes the CAN communication unit 40a to sequentially transmit a plurality of bit data configuring the data frame. In the data frame for CAN shown in FIG. 2, bit data is sequentially transmitted from the leftmost bit data.

As described above, the CAN communication unit 40a receives the bit data transmitted by itself. In addition, it is possible to detect a collision while transmitting the bit data included in the ID field of the data frame.

After executing step S13, the control unit 45 determines whether or not a collision has occurred on the first communication bus 12 (step S14). In a case where the control unit 45 gives an instruction to transmit bit data indicating "0" (recessive) in step S13, when the CAN communication unit 40a receives bit data indicating "1" (dominant), the control unit 45 determines that a collision has occurred. When the control unit 45 gives an instruction to transmit bit data indicating "1" in step S13 or when both the bit data giving an instruction for transmission in step S13 and the bit data received by the CAN communication unit 40a indicate "0", the control unit 45 determines that no collision has occurred.

When it is determined that no collision has occurred (S14: NO), the control unit 45 determines whether or not the transmission of the bit data included in the ID field of the data frame generated in step S12 has been completed (step S15). When it is determined that the transmission of the bit data included in the ID field has not been completed (S15: NO), the control unit 45 executes step S13 to cause the CAN communication unit 40a to transmit the next bit data.

When it is determined that the transmission of the bit data included in the ID field has been completed (S15: YES), the control unit 45 instructs the CAN communication unit 40a to transmit one bit data of the data frame generated in step S12 as in step S13 (step S16). As a result, the CAN communication unit 40a transmits the bit data through the first communication bus 12. In the first relay data transmission process, the control unit 45 repeatedly executes step S16. Since the transmission of the bit data included in the ID field has been completed, the CAN communication unit 40a sequentially transmits the bit data from the bit data included in the next field of the ID field.

After executing step S16, the control unit 45 determines whether or not the transmission of all the bit data configuring the data frame generated in step S12 has been completed (step S17). When it is determined that the transmission of all the bit data has not been completed (S17: NO), the control unit 45 executes step S16 again to cause the CAN communication unit 40a to transmit the next bit data. The CAN communication unit 40a sequentially transmits the bit data until the transmission of all the bit data configuring the data frame is completed.

Since the communication through the first communication bus 12 conforms to the CAN protocol, no collision occurs in the transmission of the bit data included in the fields after the ID field. The number of devices that perform transmission through the first communication bus 12 is one. Therefore, for the transmission of bit data according to step S16, the control unit 45 does not determine whether or not a collision has occurred.

When it is determined that the transmission of all the bit data has been completed (S17: YES), the control unit 45 deletes, from the temporary storage unit 42, the relay data transmitted by the CAN communication unit 40a and the transmission stop count data corresponding to the transmitted relay data (step S18). After executing step S18, the control unit 45 ends the first relay data storage process.

Until the first relay data storage process ends after determining that a collision has occurred, the control unit 45 does not instruct the CAN communication unit 40a to transmit bit data so that the CAN communication unit 40a stops the transmission of the data frame generated in S12. A device different from the relay device 30, that is, at least one of the two high-performance ECUs 10 and the three low-performance ECUs 11, continues the transmission of the data frame through the first communication bus 12.

When it is determined that a collision has occurred (S14: YES), the control unit 45 increments the number of transmission stops by 1, the number of transmission stops being indicated by the transmission stop count data corresponding to the relay data to be transmitted (step S19). Then, the control unit 45 determines whether or not the transmission of bit data before the collision notification field in the data frame has been completed, the data frame being transmitted by the device different from the relay device 30 through the first communication bus 12 (step S20).

When it is determined that the transmission of the bit data before the collision notification field has not been completed (S20: NO), the control unit 45 executes step S20 again and waits until the transmission of the bit data before the collision notification field is completed.

When it is determined that the transmission of the bit data before the collision notification field has been completed (S20: YES), the control unit 45 instructs the CAN communication unit 40a to transmit bit data indicating "1" (dominant) (step S21). As a result, the bit data included in the collision notification field of the data frame which is in transmission, indicates "1" so that all the devices connected to the first communication bus 12 are notified of the occurrence of the collision.

After executing step S21, the control unit 45 ends the first relay data transmission process. The relay data, transmission of which has been stopped, continues to be stored in the temporary storage unit 42 in a state in which the number of transmission stops is incremented by 1. In the next first relay data transmission process, the transmission of the stored relay data is restarted.

When it is determined that the device as a transmission destination is one of the two high-performance ECUs 10 (S11: YES), the control unit 45 determines whether or not the number of transmission stops indicated by the transmission stop count data corresponding to the relay data to be transmitted, that is, the number of transmission stops of the relay data to be transmitted, is equal to or greater than a first threshold value (step S22). The first threshold value is an integer of two or more, and is set in advance. The first threshold value corresponds to the second predetermined number of times.

When it is determined that the number of transmission stops is less than the first threshold value (S22: NO), the control unit 45 determines whether or not the number of times of detecting a collision within the reference period is equal to or greater than a second threshold value (step S23). Hereinafter, the number of times of detecting a collision within the reference period is referred to the number of collision detections. The reference period is fixed, and is set in advance. The second threshold value is a natural number, and is set in advance. The second threshold value corresponds to the predetermined number of times.

Figure 7:
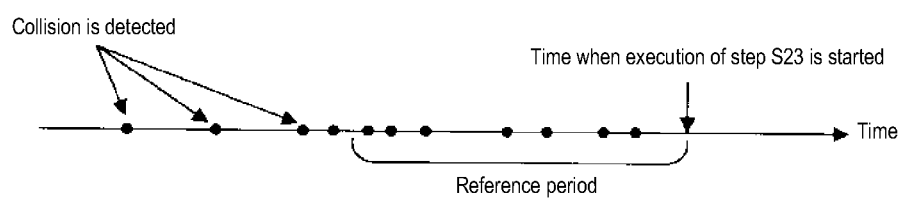
FIG. 7 is an explanatory diagram of the number of collision detections.

FIG. 7 is an explanatory diagram of the number of collision detections. In FIG. 7, on the time axis, a point in time when a collision is detected is shown by a black circle. A point in time when a collision is detected is specifically a point in time (date and time) indicated by the first collision time data stored in the temporary storage unit 42. The number of collision detections is the number of times by which a collision is detected during a period from the time traced back by the reference period from the start of the execution of step S23 to the time when the execution of step S23 is started. In the example of FIG. 7, the number of collision detections is 7.

When the number of collision detections is less than the second threshold value (S23: NO), the control unit 45 executes step S12. Therefore, in a case where the device as a transmission destination is one of the two high-performance ECUs 10, when the number of transmission stops is less than the first threshold value and the number of collision detections is less than the second threshold value, the CAN communication unit 40a starts the transmission of relay data through the first communication bus 12. The CAN communication unit 40a functions as a first transmission unit.

When it is determined that the number of transmission stops is equal to or greater than the first threshold value (S22: YES) or when it is determined that the number of collision detections is equal to or greater than the second threshold value (S23: YES), the control unit 45 generates a data frame for Ethernet including relay data to be transmitted as main data (step S24).

Then, the control unit 45 selects one Ethernet communication unit 41a of the two Ethernet communication units 41a based on the device that is a transmission destination of the relay data (step S25). Then, the control unit 45 instructs the Ethernet communication unit 41a selected in step S25 to transmit the data frame generated in step S24 (step S26). As a result, the Ethernet communication unit 41a selected in step S25 transmits the data frame generated in step S24 to the high-performance ECU 10 through the first communication line 13. The data frame generated in step S24 is a data frame including data for which the CAN communication unit 40a has stopped the transmission. The Ethernet communication unit 41a transmits a data frame when the control unit 45 determines that the number of transmission stops is equal to or greater than the first threshold value. The data frame transmitted by the Ethernet communication unit 41a includes main data for which the CAN communication unit 40a has stopped the transmission. The Ethernet communication unit 41a functions as a second transmission unit.

After executing step S26, the control unit 45 deletes, from the temporary storage unit 42, the relay data transmitted by the Ethernet communication unit 41a and the transmission stop count data corresponding to the transmitted relay data (step S27). After executing step S27, the control unit 45 ends the first relay data transmission process.

As described above, in the relay device 30, the relay data, the device as a transmission destination of which is one of the three low-performance ECUs 11, is transmitted by the CAN communication unit 40a through the first communication bus 12. For the relay data, the device as a transmission destination of which is one of the two high-performance ECUs 10, when the number of transmission stops is less than the first threshold value and the number of collision detections is less than the second threshold value, the CAN communication unit 40a transmits the relay data through the first communication bus 12. For the relay data, the device as a transmission destination of which is one of the two high-performance ECUs 10, when the number of transmission stops is equal to or greater than the first threshold value or when the number of collision detections is equal to or greater than the second threshold value, one of the two Ethernet communication units 41a transmits the relay data through the first communication line 13.

For the relay data, the device as a transmission destination device of which is one of the two high-performance ECUs 10, when the number of times of simultaneous transmission through the first communication bus 12 within the reference period, that is, the number of collision detections, is large, the communication load of the first communication bus 12 is large. Therefore, the relay data is transmitted through the first communication line 13. For this reason, the relay data is not stagnant in the relay device 30 for a long period of time. The period required for transmitting the relay data is short. The communication load is the percentage of the transmission period during which the data frame is transmitted through the first communication bus 12 per unit time.

When the number of collision detections is less than the second threshold value, the CAN communication unit 40a starts transmitting the relay data through the first communication bus 12. In the transmission of the relay data through the first communication bus, there is a possibility that the transmission is stopped due to the occurrence of a collision. When the number of transmission stops of the common relay data reaches the first threshold value, one of the two Ethernet communication units 41a transmits, through the first communication line 13, the common relay data for which the CAN communication unit 40a has stopped the transmission.

As described above, when the transmission is stopped due to the occurrence of a collision, the relay data is transmitted through the first communication line 13, so that the period required for transmitting the relay data is shorter. In addition, since the relay data is transmitted through the first communication line 13 when the number of transmission stops is large, the frequency of transmitting the data frame through the first communication bus 12 is adjusted to an appropriate value.

The control unit 45 performs the second relay data transmission process when relay data, the device as a transmission destination of which is one of the two high-performance ECUs 20 and the three low-performance ECUs 21, is stored in the temporary storage unit 42. The second relay data transmission process is similar to the first relay data transmission process. In the description of the first relay data transmission process, the high-performance ECU 10, the low-performance ECU 11, the first communication bus 12, the first communication line 13, the CAN communication unit 40a, the Ethernet communication unit 41a, and the first collision time data are replaced with the high-performance ECU 20, the low-performance ECU 21, the second communication bus 22, the second communication line 23, the CAN communication unit 40b, the Ethernet communication unit 41b, and the second collision time data, respectively. In this manner, it is possible to understand the second relay data transmission process. The CAN communication unit 40b also functions as a first transmission unit. The Ethernet communication unit 41b also functions as a second transmission unit.

Therefore, also for the transmission of relay data, the device as a transmission destination of which is one of the two high-performance ECUs 20 and the three low-performance ECUs 21, the relay device 30 achieves the similar effects as for the transmission of relay data, the device as a transmission destination of which is one of the two high-performance ECUs 10 and the three low-performance ECUs 11.

In the relay device 30, the number of Ethernet communication units 41a is smaller than the number of devices that receive data frames from the CAN communication unit 40a through the first communication bus 12. In addition, the number of Ethernet communication units 41b is smaller than the number of devices that receive data frames from the CAN communication unit 40b through the second communication bus 22. Therefore, the number of high-performance ECUs 10 and the number of high-performance ECUs 20 are small. As a result, the manufacturing cost of the relay device 30 and the communication system N is low.

In the relay device 30, the CAN communication unit 40b receives data frames from the two high-performance ECUs 20 and the three low-performance ECUs 21. The Ethernet communication unit 41b receives a data frame from the high-performance ECU 20 connected to itself. The main data included in the data frame received by each of the CAN communication unit 40b and the Ethernet communication unit 41b is stored in the temporary storage unit 42. Each of the CAN communication unit 40a and the Ethernet communication unit 41a transmits a data frame including the main data stored in the temporary storage unit 42. As a result, transmission from one of the high-performance ECU 20, and the low-performance ECU 21 to one of the high-performance ECU 10, and the low-performance ECU 11 is relayed.

Similarly, the CAN communication unit 40a receives data frames from the two high-performance ECUs 10 and the three low-performance ECUs 11. The Ethernet communication unit 41a receives a data frame from the high-performance ECU 10 connected to itself. The main data included in the data frame received by each of the CAN communication unit 40a and the Ethernet communication unit 41a is stored in the temporary storage unit 42. Each of the CAN communication unit 40b and the Ethernet communication unit 41b transmits a data frame including the main data stored in the temporary storage unit 42. As a result, transmission from one of the high-performance ECU 10, and the low-performance ECU 11 to one of the high-performance ECU 20, and the low-performance ECU 21 is relayed.

Each of the CAN communication units 40a and 40b and the Ethernet communication units 41a and 41b also functions as a reception unit.

The high-performance ECUs 10 and 20 transmit the main data in the similar manner as the relay device 30, and achieve the similar effects as that of the relay device 30 for the transmission of the main data. Hereinafter, the detailed configuration of the high-performance ECU 10 will be described.

Figure 8:
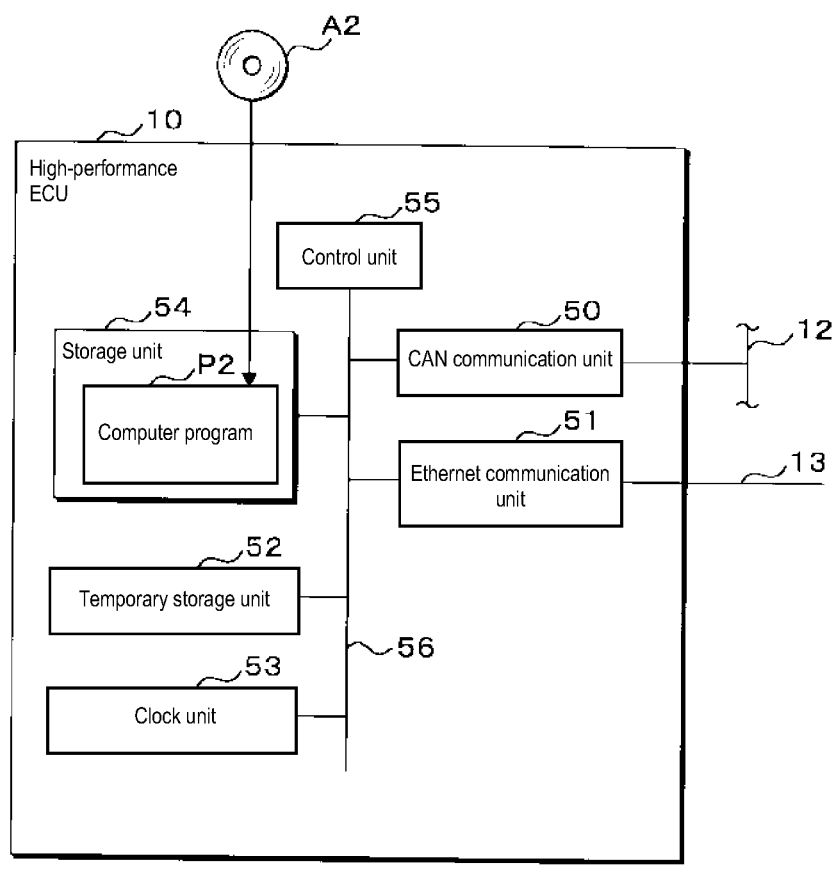
FIG. 8 is a block diagram showing the main configuration of a high-performance ECU.

FIG. 8 is a block diagram showing the main configuration of the high-performance ECU 10. The high-performance ECU 10 includes a CAN communication unit 50, an Ethernet communication unit 51, a temporary storage unit 52, a clock unit 53, a storage unit 54, and a control unit 55. These are connected to an internal bus 56 in the high-performance ECU 10. The CAN communication unit 50 is further connected to the first communication bus 12. The Ethernet communication unit 51 is further connected to the first communication line 13.

Each of the CAN communication unit 50 and the Ethernet communication unit 51 is an interface, and transmits a data frame according to the instruction of the control unit 55. Specifically, these sequentially transmit a plurality of bit data configuring the data frame. The CAN communication unit 50 further transmits, according to the instruction of the control unit 55, bit data which indicates "1" (dominant), in the collision notification field of the data frame transmitted through the first communication bus 12 by a device different from the high-performance ECU 10.

The CAN communication unit 50 receives all the data frames transmitted through the first communication bus 12. The Ethernet communication unit 51 receives the data frame transmitted from the relay device 30 through the first communication line 13. The control unit 55 acquires the data frames received by the CAN communication unit 50 and the Ethernet communication unit 51 from these.

The control unit 55 stores data in the temporary storage unit 52. Data is temporarily stored in the temporary storage unit 52. The data stored in the temporary storage unit 52 is read out from the temporary storage unit 42 by the control unit 55. The control unit 55 stores control data and transmission data in the temporary storage unit 42. The control data is used in the control of an electric device. The transmission data is transmitted through the first communication bus 12 or the first communication line 13. In addition, the control unit 55 stores transmission stop count data in the temporary storage unit 52 so as to be associated with the transmission data. The transmission stop count data indicates the number of transmission stops by which the transmission has been stopped. The number of times indicated by the transmission stop count data indicates the number of times by which the CAN communication unit 50 has stopped transmitting the transmission data corresponding to itself.

The control unit 55 further stores, in the temporary storage unit, collision time data which indicates the date and time when a collision occurs on the first communication bus 12. The data stored in the temporary storage unit 52 is deleted when the supply of power to the temporary storage unit 52 is stopped.

The control unit 55 acquires date and time data indicating the date and time from the clock unit 53. The date and time data acquired by the control unit 55 indicates the date and time when the date and time data is acquired.

The storage unit 54 is a non-volatile memory. A computer program P2 is stored in the storage unit 54. The control unit 55 includes one or more CPUs. One or more CPUs included in the control unit 55 execute the computer program P2 to perform a control data storage process, a control process, a transmission data storage process, and a transmission data transmission process in parallel.

The control data storage process is a process of storing, in the temporary storage unit 52 as control data, the main data included in the data frame received by the CAN communication unit 50 or the Ethernet communication unit 51. The control process is a process of performing control related to an electric device based on the control data stored in the temporary storage unit 52. The transmission data storage process is a process of generating transmission data and of storing the generated transmission data. The transmission data transmission process is a process of transmitting transmission data.

The computer program P2 is used to cause one or more CPUs of the control unit 55 to execute the control data storage process, the control process, the transmission data storage process, and the transmission data transmission process.

The computer program P2 may be stored in a storage medium A2 so as to be readable by one or more CPUs included in the control unit 55. In this case, the computer program P2 read out from the storage medium A2 by a reader (not shown) is stored in the storage unit 54. The storage medium A2 is an optical disk, a flexible disk, a magnetic disk, a magnetic optical disk, a semiconductor memory, or the like. The computer program P2 may be downloaded from an external device (not shown) connected to a communication network (not shown). The downloaded computer program P2 may be stored in the storage unit 54.

Figure 9:
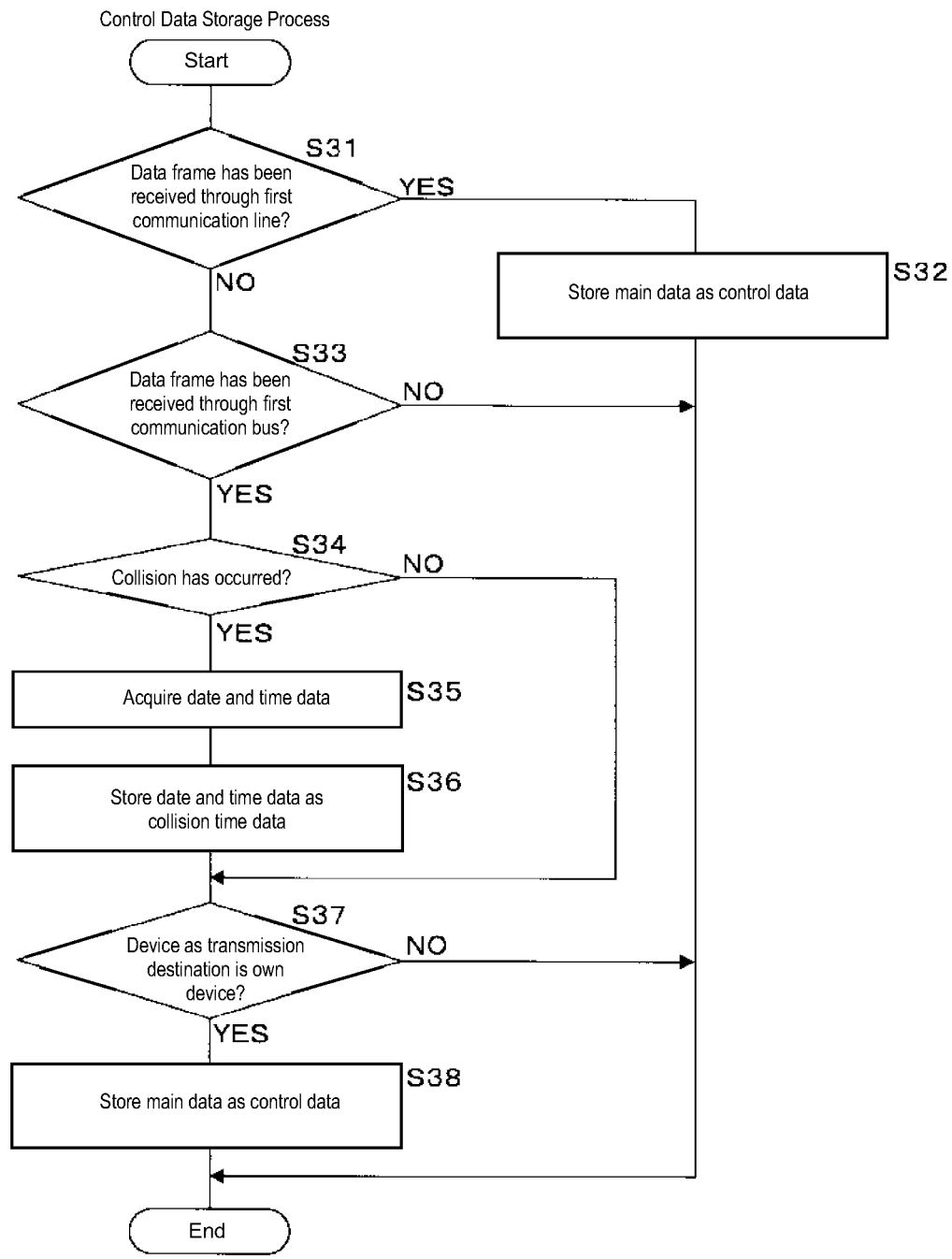
FIG. 9 is a flowchart showing the procedure of a control data storage process.

FIG. 9 is a flowchart showing the procedure of the control data storage process. The control unit 55 cyclically performs the control data storage process. Steps S31 to S36 of the control data storage process are similar to steps S1 to S6 of the first relay data storage process, respectively. Therefore, the detailed description of steps S31 to S36 will be omitted.

In the description of steps S1 to S6, the CAN communication unit 40a, the Ethernet communication unit 41a, the control unit 45, the relay data, and the first collision time data are replaced with the CAN communication unit 50, the Ethernet communication unit 51, the control unit 55, the control data, and the collision time data, respectively. In this manner, it is possible to understand steps S31 to S36. The control unit 55 also functions as a detection unit.

In step S32, the control unit 55 stores, in the temporary storage unit 52 as control data, the main data included in the data frame received by the Ethernet communication unit 51. After executing step S32, the control unit 55 ends the control data storage process. In addition, when it is determined that no data frame has been received through the first communication bus 12 (S33: NO), the control unit 55 ends the control data storage process. In step S36, the control unit 55 stores, in the temporary storage unit 52 as collision time data, the date and time data acquired in step S35.

When it is determined that no collision has occurred on the first communication bus 12 (S34: NO) or after executing step S36, the control unit 55 determines whether or not the device as a transmission destination of the main data included in the data frame received by the CAN communication unit 50 is its own device (step S37). A plurality of identification data corresponding to the main data, the device as a transmission destination of which is its own device, are stored in the storage unit 54.

In step S37, when the identification data included in the ID field of the data frame received by the CAN communication unit 50 matches one of the plurality of identification data stored in the storage unit 54, the control unit 55 determines that the device as a transmission destination is its own device. When the identification data included in the ID field of the data frame received by the CAN communication unit 50 does not match any of the plurality of identification data stored in the storage unit 54, the control unit 55 determines the device as a transmission destination is not its own device.

When it is determined that the device as a transmission destination is not its own device (S37: NO), the control unit 55 ends the control data storage process. Thereafter, the control unit 55 ignores the data frame without performing the process relevant to the data frame received by the CAN communication unit 50.

When it is determined that the device as a transmission destination is its own device (S37: YES), the control unit 55 stores, in the temporary storage unit 52 as control data, the main data included in the data field of the data frame received by the CAN communication unit 50 (step S38). After executing step S38, the control unit 55 ends the control data storage process.

As described above, when no data frame is received through the first communication bus 12 or the first communication line 13, the control unit 55 repeatedly performs the control data storage process, and waits until a data frame is received through the first communication bus 12 or the first communication line 13. When the Ethernet communication unit 51 has received a data frame through the first communication line 13, the control unit 55 stores, as control data, the main data included in the data frame received by the Ethernet communication unit 51.

In a case where the CAN communication unit 50 has received a data frame through the first communication bus 12, when the device as a transmission destination of the data frame received by the CAN communication unit 50 is its own device, the control unit 55 stores, in the temporary storage unit 52 as control data, the main data included in the received data frame. In addition, when the simultaneous transmission of a plurality of data frames through the first communication bus 12 is detected, the control unit 55 stores collision time data indicating the date and time when the simultaneous transmission is detected.

The control unit 55 performs the control process when control data is stored in the temporary storage unit 52. In the control process, the control unit 55 performs processing based on the control data stored in the temporary storage unit 52. For example, the control unit 55 causes an output unit (not shown) to output data giving an instruction for a specific operation to an electric device, so that the electric device performs the specific operation. Thereafter, the control unit 55 deletes, from the temporary storage unit 52, the control data relevant to the executed processing. Then, the control unit 55 ends the control process. When other control data are stored in the temporary storage unit 52, the control unit 55 performs the control process again.

Figure 10:
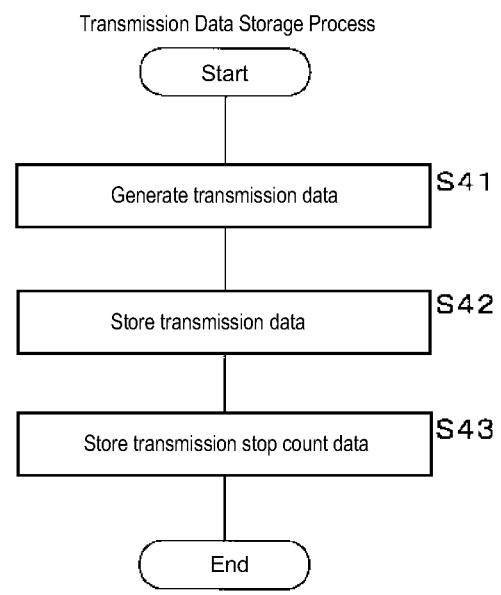
FIG. 10 is a flowchart showing the procedure of a transmission data storage process.

FIG. 10 is a flowchart showing the procedure of the transmission data storage process. The control unit 55 performs the transmission data storage process, for example, when data indicating a sensor detection result, data giving an instruction for a specific operation, or the like is input to an input unit (not shown). In the transmission data storage process, first, the control unit 55 generates transmission data (step S41), and stores the generated transmission data in the temporary storage unit 52 (step S42).

Then, the control unit 55 stores transmission stop count data so as to be associated with the transmission data stored in step S42 (step S43). At the time when step S43 is executed, the high-performance ECU 10 does not start transmitting the transmission data stored in step S42. Therefore, in step S43, the control unit 55 stores, in the temporary storage unit 52, transmission stop count data indicating zero as the number of transmission stops.

After executing step S43, the control unit 55 ends the transmission data storage process.

Figure 11:
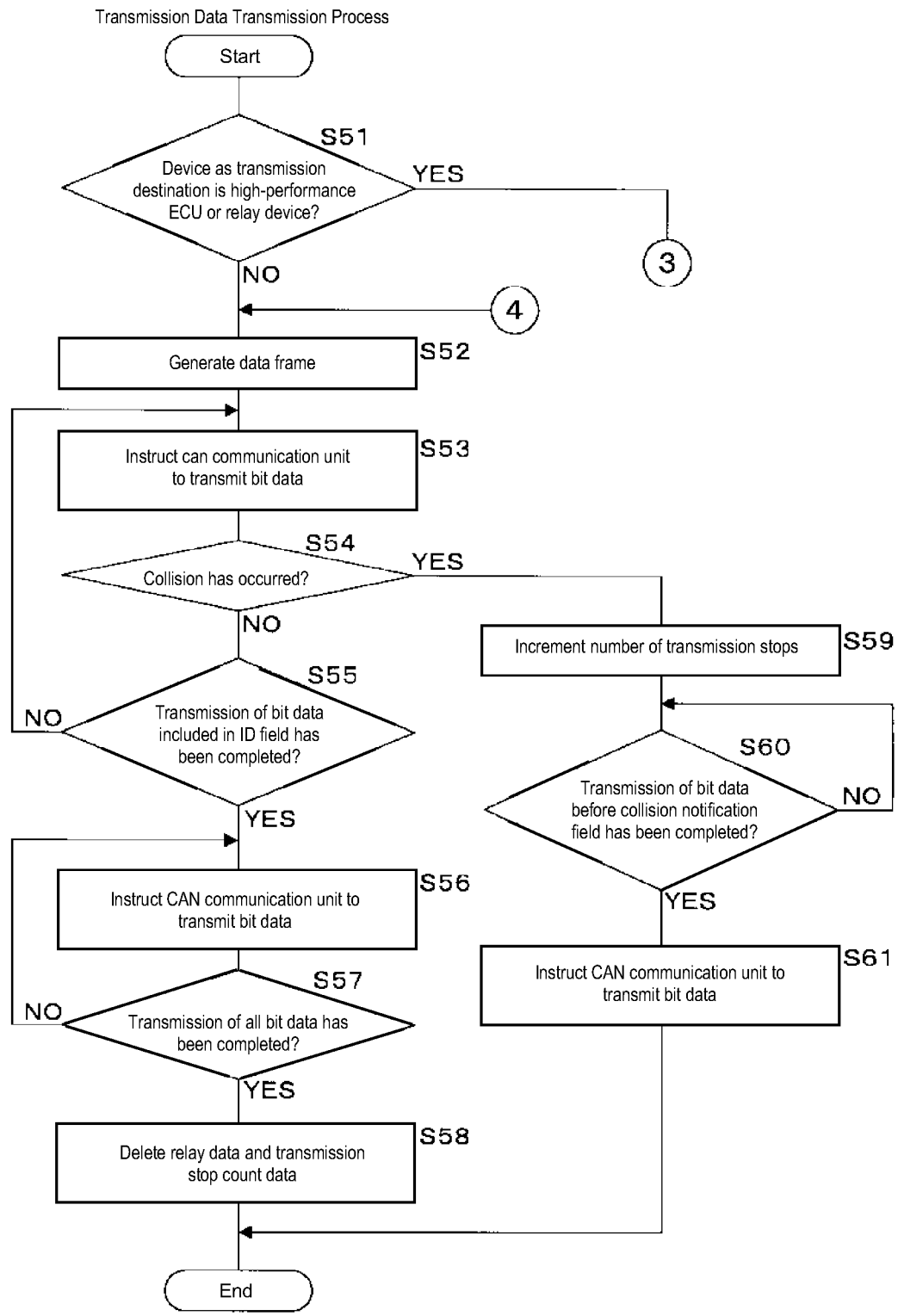
FIG. 11 is a flowchart showing the procedure of the transmission data transmission process.
Figure 12:
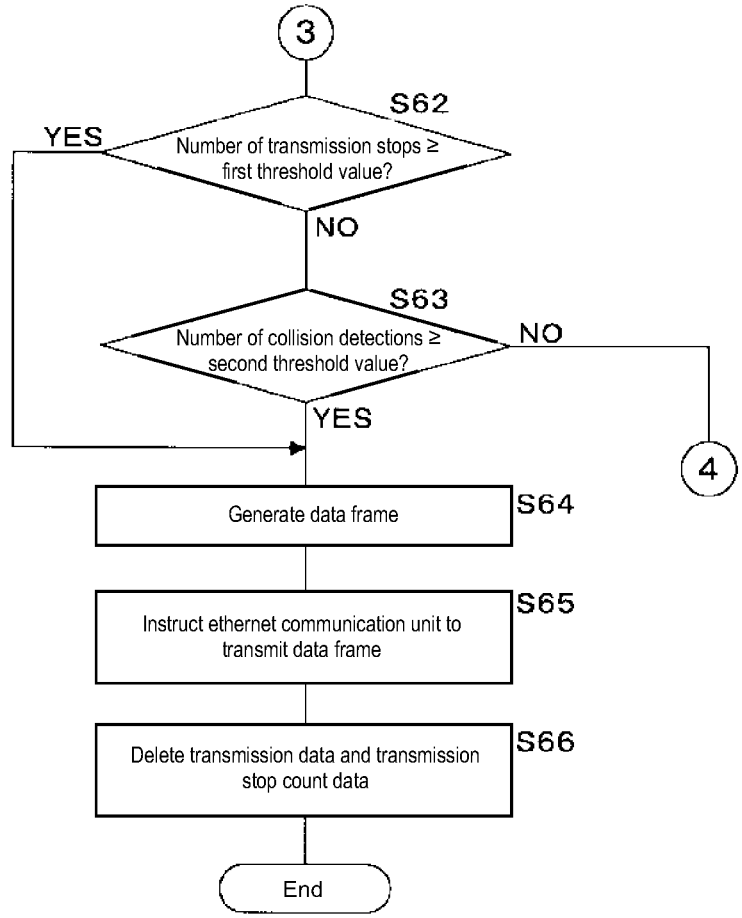
FIG. 12 is a flowchart showing the procedure of the transmission data transmission process.

FIGS. 11 and 12 are flowcharts showing the procedure of the transmission data transmission process. The control unit 55 performs the transmission data transmission process when transmission data, the device as a transmission destination of which is one of the high-performance ECU 10 different from its own device, the low-performance ECU 11, and the relay device 30, is stored in the temporary storage unit 42. The device as a transmission destination of the transmission data is appropriately determined according to the content of the transmission data. Specifically, the transmission data, the device as a transmission destination of which is the relay device 30 is transmission data, the device as a transmission destination of which is a device different from any device connected to the first communication bus 12.

Steps S52 to S64 in the transmission data transmission process are similar to steps S12 to S24 in the first relay data transmission process, respectively. Therefore, the detailed description of steps S52 to S64 will be omitted. In the description of steps S12 to S24, the CAN communication unit 40a, the temporary storage unit 42, the control unit 45, and the relay data are replaced with the CAN communication unit 50, the temporary storage unit 52, the control unit 55, and the transmission data, respectively. In this manner, it is possible to understand steps S52 to S64. The CAN communication unit 50 also functions as a first transmission unit.

In the transmission data transmission process, first, the control unit 55 determines whether or not the device as a transmission destination of transmission data to be transmitted is the high-performance ECU 10 different from its own device or the relay device 30 (step S51). When it is determined that the device as a transmission destination is not the high-performance ECU 10 or the relay device 30, that is, when it is determined that the device as a transmission destination is one of the three low-performance ECUs 11 (S51: NO), the control unit 55 executes step S52. The CAN communication unit 50 transmits transmission data through the first communication bus 12.

When a collision occurs so that the CAN communication unit 50 stops transmission through the first communication bus 12, at least one of the high-performance ECU 10 different from its own device, the three low-performance ECUs 11 and the relay device 30 continues the transmission through the first communication bus 12. The CAN communication unit 50 transmits bit data indicating "1" (dominant) in the collision notification field of the data frame transmitted through the first communication bus 12 so that the notification of collision is performed.

When the device as a transmission destination is the high-performance ECU 10 different from its own device or the relay device 30 (S51: YES), the control unit 55 executes step S62. When it is determined that the number of transmission stops is equal to or greater than the first threshold value (S62: YES) or when it is determined that the number of collision detections is equal to or greater than the second threshold value (S63: YES), the control unit 55 executes step S64. In step S64, a data frame for Ethernet is generated.

The number of collision detections in the transmission data transmission process is the number of times by which a collision is detected during a period from the time traced back by the reference period from the start of the execution of step S63 to the time when the execution of step S63 is started. The first threshold value relevant to the transmission data transmission process may be the same as or different from the first threshold value relevant to the relay data transmission process. Similarly, the second threshold value relevant to the transmission data transmission process may be the same as or different from the second threshold value relevant to the relay data transmission process.

After executing step S64, the control unit 55 instructs the Ethernet communication unit 51 to transmit the data frame generated in step S64 (step S65). As a result, the Ethernet communication unit 51 transmits the data frame generated in step S64 to the relay device 30 through the first communication line 13. When the device as a transmission destination of the transmission data is the high-performance ECU 10 different from its own device, the transmission data is transmitted to the high-performance ECU 10 through the relay device 30. The Ethernet communication unit 51 also functions as a second transmission unit.

After executing step S65, the control unit 55 deletes, from the temporary storage unit 52, the transmission data transmitted by the Ethernet communication unit 51 and the transmission stop count data corresponding to the transmitted transmission data (step S66). After executing step S66, the control unit 55 ends the transmission data transmission process.

As described above, in the high-performance ECU 10, the transmission data, the device as a transmission destination of which is one of the three low-performance ECUs 11, is transmitted by the CAN communication unit 50 through the first communication bus 12. For the transmission data, the device as a transmission destination of which is the high-performance ECU 10 different from its own device or the relay device 30, when the number of transmission stops is less than the first threshold value and the number of collision detections is less than the second threshold value, the CAN communication unit 50 transmits the transmission data through the first communication bus 12.

For the transmission data, the device as a transmission destination of which is the high-performance ECU 10 different from its own device or the relay device 30, when the number of transmission stops is equal to or greater than the first threshold value or when the number of collision detections is equal to or greater than the second threshold value, the Ethernet communication unit 51 transmits the transmission data.

For the transmission of transmission data, the high-performance ECU 10 achieves the similar effects as that of the relay device 30.

The configuration of the high-performance ECU 20 is similar to the configuration of the high-performance ECU 10. In the description of the configuration of the high-performance ECU 10, the first communication bus 12 and the first communication line 13 are replaced with the second communication bus 22 and the second communication line 23, respectively. In this manner, it is possible to understand the configuration of the high-performance ECU 20. The high-performance ECU 20 achieves the similar effects as that of the high-performance ECU 10.

The priority relevant to the transmission of the main data transmitted only through the first communication bus 12, that is, the main data, transmission destination or transmission source of which is the low-performance ECU 11, is preferably higher than the priority relevant to the transmission of the main data that can be transmitted through the first communication bus 12 and through the first communication line 13. In this case, the period required for transmitting the main data is shorter. Similarly, the priority relevant to the transmission of the main data transmitted only through the second communication bus 22, that is, the main data, transmission destination or transmission source of which is the low-performance ECU 21, is preferably higher than the priority relevant to the transmission of the main data that can be transmitted through the second communication bus 22 and through the second communication line 23. Also in this case, the period required for transmitting the main data is shorter.

Embodiment 2

The configuration for notifying of the simultaneous transmission of a plurality of data frames through the first communication bus 12 or the second communication bus 22, is not limited to the configuration in which the device that has stopped the transmission transmits bit data indicating "1" (dominant) in the collision notification field of the data frame which is in transmission.

Hereinafter, the differences between Embodiments 1 and 2 will be described. Other configurations excluding the configuration described below are similar to those in Embodiment 1. Therefore, the similar components as in Embodiment 1 are denoted by the same reference numerals as in Embodiment 1, and the description thereof will be omitted.

Figure 13:
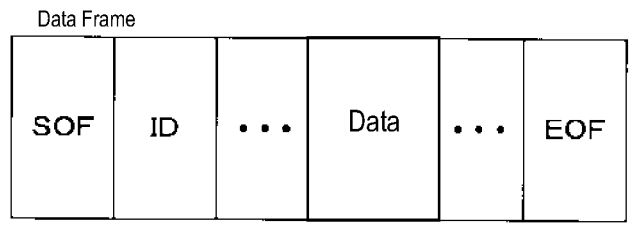
FIG. 13 is an explanatory diagram of a data frame for CAN in Embodiment 2.

FIG. 13 is an explanatory diagram of a data frame for CAN in Embodiment 2. In the data frame for CAN in Embodiment 2, as in Embodiment 1, the SOF field, the ID field, the data field, the EOF field, and the like are provided. In the data frame for CAN in Embodiment 2, the collision detection field is not provided. Therefore, the device that has stopped transmission does not notify of a collision by transmitting bit data indicating "1" (dominant) in the collision notification field of the data frame which is in transmission.

Figure 14:
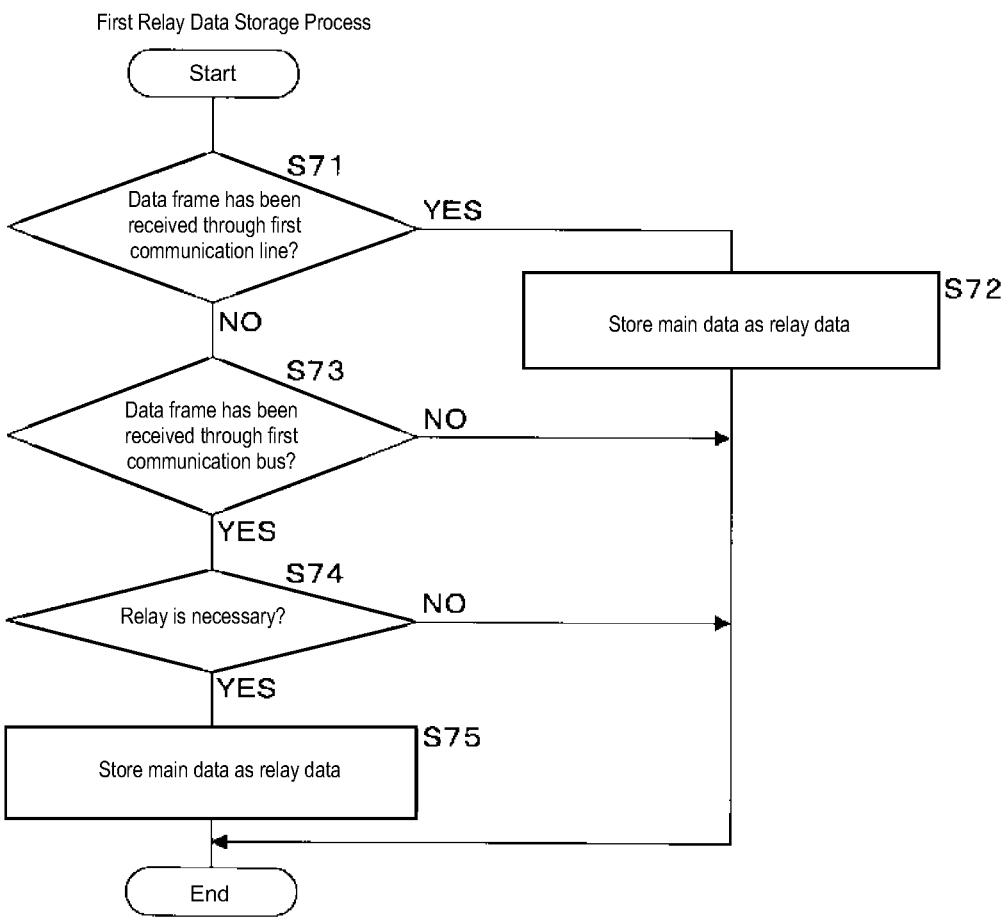
FIG. 14 is a flowchart showing the procedure of a first relay data storage process.

FIG. 14 is a flowchart showing the procedure of the first relay data storage process. Also in Embodiment 2, the control unit 45 of the relay device 30 cyclically performs the first relay data storage process. Steps S71 to S73, S74, and S75 of the first relay data storage process in Embodiment 2 are similar to the steps S1 to S3, S7, and S8 of the first relay data storage process in Embodiment 1, respectively. Therefore, the detailed description of steps S71 to S75 will be omitted.

When it is determined that a data frame has been received through the first communication bus 12 (S73: YES), the control unit 45 executes step S74. After executing one of steps S72 and S75, the control unit 45 ends the first relay data storage process.

As described above, when no data frame is received through the first communication bus 12 or the first communication line 13, the control unit 45 repeatedly performs the first relay data storage process, and waits until a data frame is received through the first communication bus 12 or the first communication line 13. When the Ethernet communication unit 41a has received a data frame through the first communication line 13, the control unit 45 stores, as relay data, the main data included in the data frame received by the Ethernet communication unit 41a.

In a case where the CAN communication unit 40a has received a data frame through the first communication bus 12, when it is necessary to relay the transmission of the main data included in the data frame received by the CAN communication unit 40a, the control unit 45 stores the main data in the temporary storage unit 42 as relay data.

The content of the second relay data storage process in Embodiment 2 is similar to the content of the first relay data storage process.

Figure 15:
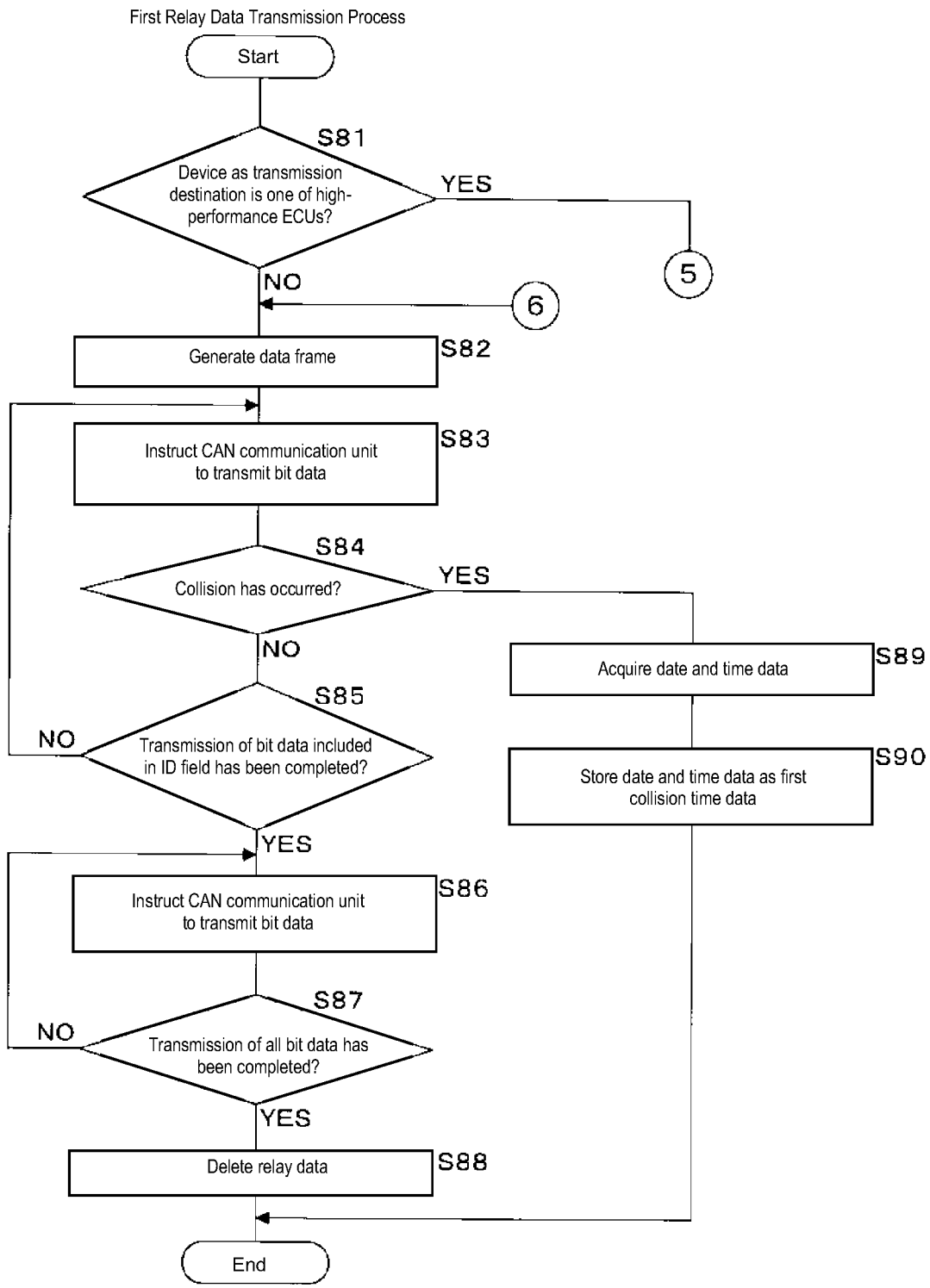
FIG. 15 is a flowchart showing the procedure of a first relay data transmission process.
Figure 16:
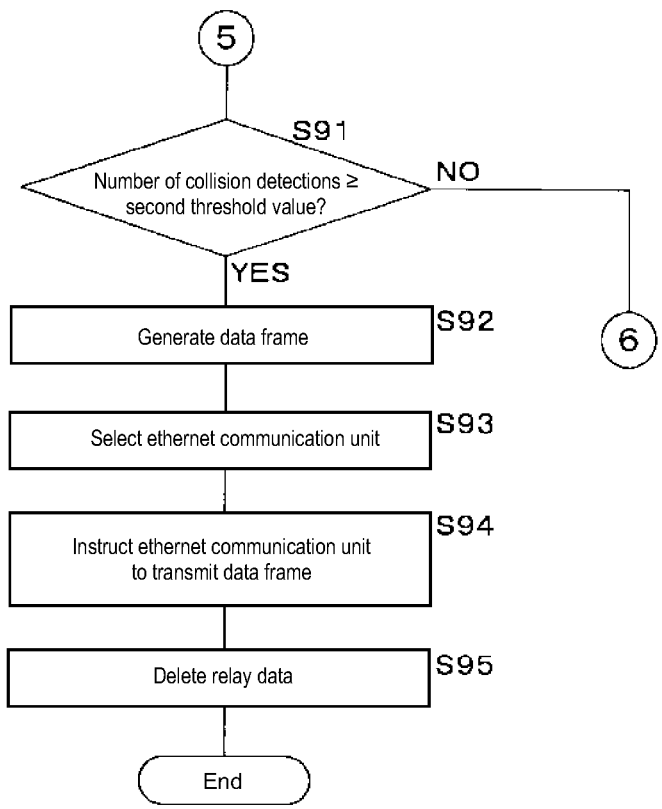
FIG. 16 is a flowchart showing the procedure of the first relay data transmission process.

FIGS. 15 and 16 are flowcharts showing the procedure of the first relay data transmission process. Similar to Embodiment 1, the control unit 45 performs the first relay data transmission process when relay data, the device as a transmission destination of which is one of the two high-performance ECUs 10 and the three low-performance ECUs 11, is stored in the temporary storage unit 42. Steps S81 to S87 and S91 to S94 of the first relay data transmission process in Embodiment 2 are similar to steps S11 to S17 and S23 to S26 of the first relay data transmission process in Embodiment 1, respectively. Therefore, the detailed description of steps S81 to S87 and S91 to S94 will be omitted.

The control unit 45 executes step S84 so that the control unit 45 detects a collision on the first communication bus 12, that is, simultaneous transmission of a plurality of data frames through the first communication bus 12. Specifically, in a case where the control unit 45 gives an instruction to transmit bit data indicating "0" (recessive) in step S83, when the CAN communication unit 40a receives bit data indicating "1" (dominant), the control unit 45 detects a collision.

When it is determined that the transmission of all the bit data has been completed (S87: YES), the control unit 45 deletes, from the temporary storage unit 42, the relay data transmitted by the CAN communication unit 40a (step S88). When it is determined that a collision has occurred on the first communication bus 12, that is, when simultaneous transmission of a plurality of data frames through the first communication bus 12 is detected (S84: YES), the control unit 45 acquires date and time data from the clock unit 43 (step S89). Then, the control unit 45 stores the date and time data acquired in step S89 in the temporary storage unit 42 as first collision time data (step S90). After executing one of steps S88 and S90, the control unit 45 ends the first relay data storage process.

When it is determined that the device as a transmission destination is one of the two high-performance ECUs 10 (S81: YES), the control unit 45 executes step S91. The number of collision detections in the first relay data transmission process of Embodiment 2 is the number of times by which a collision is detected during a period from the time traced back by the reference period from the start of the execution of step S91 to the time when the execution of step S91 is started. After executing step S94, the control unit 45 deletes, from the temporary storage unit 42, the relay data transmitted by the Ethernet communication unit 41a (step S95). Then, the control unit 45 ends the first relay data transmission process.

As described above, in the relay device 30, when the control unit 45 detects the simultaneous transmission of a plurality of data frames through the first communication bus 12, the control unit 45 stores first collision time data indicating the date and time when the simultaneous transmission is detected. The relay data, the device as a transmission destination of which is one of the three low-performance ECUs 11, is transmitted by the CAN communication unit 40a through the first communication bus 12. For the relay data, the device as a transmission destination device of which is one of the two high-performance ECUs 10, when the number of collision detections is less than the second threshold value, the CAN communication unit 40a transmits the relay data through the first communication bus 12. For the relay data, the device as a transmission destination of which is one of the two high-performance ECUs 10, when the number of collision detections is equal to or greater than the second threshold value, one of the two Ethernet communication units 41a transmits the relay data through the first communication line 13.

For the relay data, the device as a transmission destination device of which is one of the two high-performance ECUs 10, when the number of times of simultaneous transmission through the first communication bus 12 within the reference period, that is, the number of collision detections, is large, the communication load of the first communication bus 12 is large. Therefore, the relay data is transmitted through the first communication line 13. For this reason, the relay data is not stagnant in the relay device 30 for a long period of time. The period required for transmitting the relay data is short.

In Embodiment 2, the second relay data transmission process is similar to the first relay data transmission process. In the second relay data transmission process, the acquired date and time data is stored not as the first collision time data but as the second collision time data. Also for the transmission of relay data, the device as a transmission destination of which is one of the two high-performance ECUs 20 and the three low-performance ECUs 21, the relay device 30 achieves the similar effects as for the transmission of relay data, the device as a transmission destination device of which is one of the two high-performance ECUs 10 and the three low-performance ECUs 11.

Figure 17:
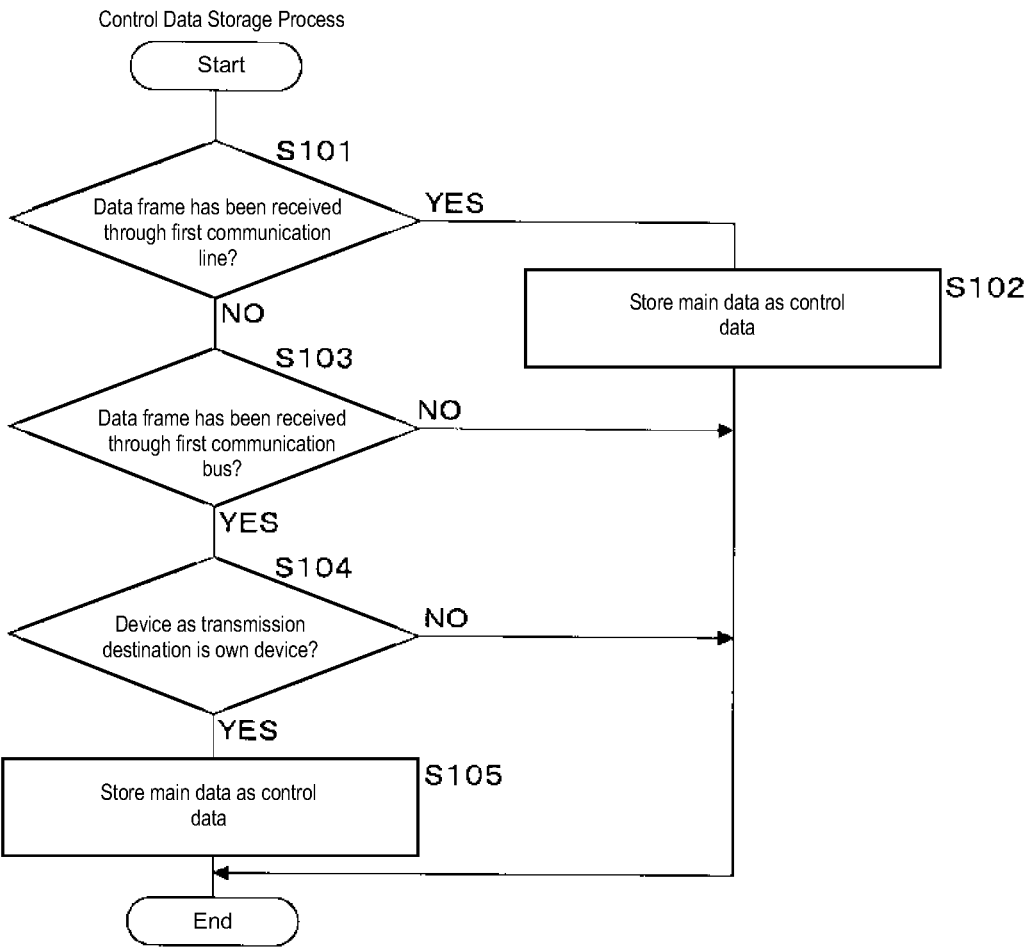
FIG. 17 is a flowchart showing the procedure of a control data storage process.

FIG. 17 is a flowchart showing the procedure of the control data storage process. The control unit 55 of the high-performance ECU 10 cyclically performs the control data storage process as in Embodiment 1. Steps S101 to S103, S104, and S105 of the control data storage process in Embodiment 2 are similar to steps S31 to S33, S37, and S38 of the control data storage process in Embodiment 1, respectively. Therefore, the detailed description of steps S101 to S105 will be omitted.

When it is determined that a data frame has been received through the first communication bus 12 (S103: YES), the control unit 55 executes step S104.

As described above, in the high-performance ECU 10, when no data frame is received through the first communication bus 12 or the first communication line 13, the control unit 55 repeatedly performs the control data storage process, and waits until a data frame is received through the first communication bus 12 or the first communication line 13. When the Ethernet communication unit 51 has received a data frame through the first communication line 13, the control unit 55 stores, as control data, the main data included in the data frame received by the Ethernet communication unit 51. In a case where the CAN communication unit 50 has received a data frame through the first communication bus 12, when the device as a transmission destination of the data frame received by the CAN communication unit 50 is its own device, the control unit 55 stores, in the temporary storage unit 52 as control data, the main data included in the received data frame.

Figure 18:
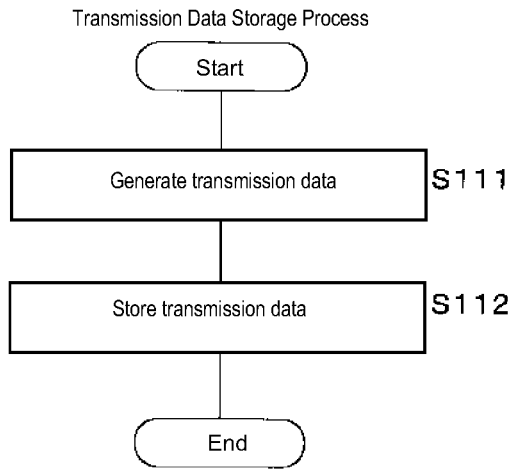
FIG. 18 is a flowchart showing the procedure of a transmission data storage process.

FIG. 18 is a flowchart showing the procedure of the transmission data storage process. Similar to Embodiment 1, the control unit 55 of the high-performance ECU 10 performs the transmission data storage process, for example, when data indicating a sensor detection result, data giving an instruction for a specific operation, or the like is input to an input unit (not shown). Steps S111 and S112 of the transmission data storage process in Embodiment 2 are similar to steps S41 and S42 of the transmission data storage process in Embodiment 1, respectively. Therefore, the detailed description of steps S111 and S112 will be omitted.

In the transmission data storage process according to Embodiment 2, the control unit 55 ends the transmission data storage process after executing step S112.

Figure 19:
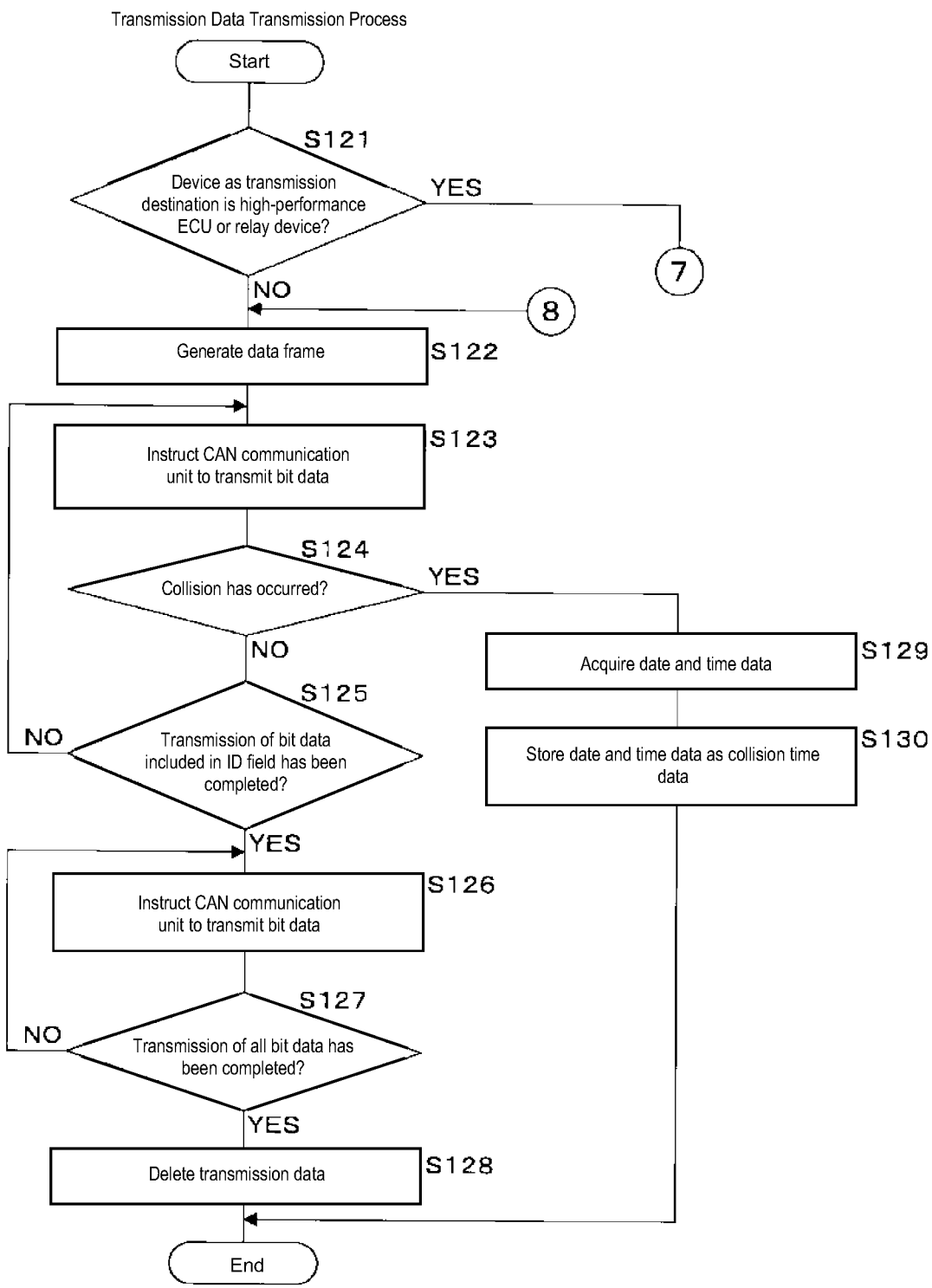
FIG. 19 is a flowchart showing the procedure of the transmission data transmission process.
Figure 20:
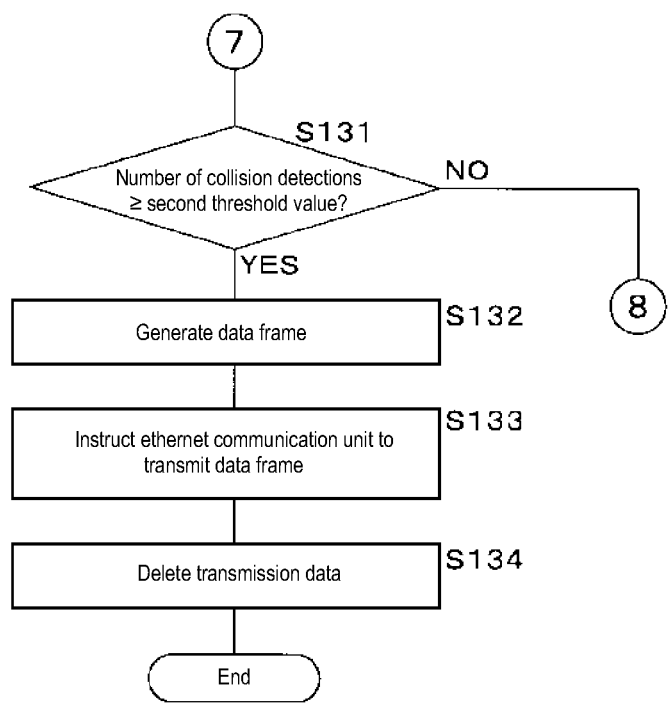
FIG. 20 is a flowchart showing the procedure of the transmission data transmission process.

FIGS. 19 and 20 are flowcharts showing the procedure of the transmission data transmission process. Similar to Embodiment 1, the control unit 55 performs the transmission data transmission process when transmission data, the device as a transmission destination of which is one of the high-performance ECU 10 different from its own device, the low-performance ECU 11, and the relay device 30, is stored in the temporary storage unit 42. Steps S121 to S127 and S131 to S133 in Embodiment 2 are similar to steps S51 to S57 and S63 to S65 in Embodiment 1, respectively. Therefore, the detailed description of steps S121 to S127 and S131 to S133 will be omitted.

The control unit 55 executes step S124 so that the control unit 55 detects a collision on the first communication bus 12, that is, simultaneous transmission of a plurality of data frames through the first communication bus 12, as in step S84 of the first relay data transmission process.

When it is determined that the transmission of all the bit data has been completed (S127: YES), the control unit 55 deletes, from the temporary storage unit 52, the transmission data transmitted by the CAN communication unit 50 (step S128). When it is determined that a collision has occurred on the first communication bus 12, that is, when simultaneous transmission of a plurality of data frames through the first communication bus 12 is detected (124: YES), the control unit 55 acquires date and time data from the clock unit 53 (step S129). Then, the control unit 55 stores, in the temporary storage unit 52 as collision time data, the date and time data acquired in step S129 (step S130). After executing one of steps S128 and S130, the control unit 55 ends the transmission data transmission process.

When the device as a transmission destination is the high-performance ECU 10 different from its own device or the relay device 30 (S121: YES), the control unit 55 executes step S131. The number of collision detections in the transmission data transmission process of Embodiment 2 is the number of times by which a collision is detected during a period from the time traced back by the reference period from the start of the execution of step S131 to the time when the execution of step S131 is started. After executing step S133, the control unit 55 deletes, from the temporary storage unit 52, the transmission data transmitted by the Ethernet communication unit 51 (step S134). Then, the control unit 55 ends the transmission data transmission process.

As described above, in the high-performance ECU 10, when the control unit 55 detects the simultaneous transmission of a plurality of data frames through the first communication bus 12, the control unit 55 stores collision time data indicating the date and time when the simultaneous transmission is detected. The transmission data, the device as a transmission destination of which is one of the three low-performance ECUs 11, is transmitted by the CAN communication unit 50 through the first communication bus 12. For the transmission data, the device as a transmission destination of which is the high-performance ECU 10 different from its own device or the relay device 30, when the number of collision detections is less than the second threshold value, the CAN communication unit 50 transmits the transmission data through the first communication bus 12. For the transmission data, the device as a transmission destination of which is the high-performance ECU 10 different from its own device or the relay device 30, when the number of collision detections is equal to or greater than the second threshold value, the Ethernet communication unit 51 transmits the transmission data.

For the transmission of transmission data, the high-performance ECU 10 achieves similar effects as that of the relay device 30.

The configuration of the high-performance ECU 20 is similar to the configuration of the high-performance ECU 10. The high-performance ECU 20 achieves similar effects as that of the high-performance ECU 10.

In Embodiments 1 and 2, the configuration for notifying of the simultaneous transmission of a plurality of data frames through the first communication bus 12 or the second communication bus 22 may be a configuration in which a data frame including the main data indicating the occurrence of a collision is transmitted through the first communication bus 12 or the second communication bus 22 when the transmission is stopped. In this case, the collision notification field is not necessary in the data frame for CAN.

The number of high-performance ECUs 10 connected to the first communication bus 12 and the number of high-performance ECUs 20 connected to the second communication bus 22 are not limited to 2, and may be 1 or 3 or more. The number of low-performance ECUs 11 connected to the first communication bus 12 and the number of low-performance ECUs 21 connected to the second communication bus 22 are not limited to 3, and may be 1, 2, or 4 or more. Among a plurality of devices connected to the first communication bus 12 or the second communication bus 22, all the devices excluding the relay device 30 may be the high-performance ECUs 10.

The protocol used for communication through the first communication bus 12 and through the second communication bus 22 is not limited to the CAN protocol. Any protocol used for communication through the communication bus can be used. The protocol used for communication through the first communication line 13 and through the second communication line 23 is not limited to the Ethernet protocol. The first threshold value for each of the relay data transmission process and the transmission data transmission process is not limited to an integer of 2 or more, and may be 1. The number of communication buses connected to the relay device 30 is not limited to 2, and may be 3 or more.

It should be considered that Embodiments 1 and 2 disclosed are examples in all points and not restrictive. The scope of the present disclosure is defined by the claims rather than the meanings set forth above, and is intended to include all modifications within the scope and meaning equivalent to the claims.

The invention claimed is:

1. A relay device for use in a communication system including a plurality of devices, the plurality of devices including a high-performance device and a low-performance device, the high-performance device connected to the relay device by a communication bus and a communication line, the low-performance device connected to the communication relay device only by the communication bus, the relay device comprising:
- a detection unit that detects simultaneous transmission of a plurality of data through a communication bus connected to a plurality of devices;
- a first communication unit using a first protocol, the first communication unit starting transmission of data through the communication bus when the number of times of detection of the simultaneous transmission within a predetermined period is less than a predetermined number of times; and
- a second transmission unit using a second protocol that is different than the first protocol, the second communication unit transmitting data to the high-performance device through the communication line when the number of times of detection of the simultaneous transmission along the communication bus within the predetermined period is equal to or greater than the predetermined number of times;
- wherein, when the simultaneous transmission through the communication bus is started, a device as a transmission source of another data excluding one of a plurality of data transmitted simultaneously stops transmission of data,
- in a case where the first communication unit starts transmission of data transmittable to a transmission destination through the communication line so that a plurality of data are transmitted simultaneously through the communication bus, when the plurality of data transmitted simultaneously includes a data, a transmission source of which is a non-connection device, or a data, a transmission destination of which is the non-connection device, the first communication unit stops the transmission of data,
- when the first transmission unit stops transmission of data through the communication bus, the second transmission unit transmits, through the communication line, data for which the first transmission unit has stopped the transmission, and
- when the number of times by which the first transmission unit has stopped transmitting common data through the communication bus becomes equal to or greater than a second predetermined number of times, the second transmission unit transmits, through the communication line, the common data for which the first transmission unit has stopped the transmission, and the second predetermined number of times is two or more.

2. The relay device according to claim 1, wherein a protocol used for communication through the communication bus is different from a protocol used for communication through the communication line.

3. The relay device according to claim 2, wherein the number of second communication units is smaller than the number of devices that receive data from the first communication unit through the communication bus.

4. The relay device according to claim 2, further comprising:
- a reception unit that receives data from a second device different from the plurality of devices connected to the communication bus,
- wherein the first communication unit and the second communication unit transmit the data received by the reception unit.

5. The relay device according to claim 1, wherein the number of second communication units is smaller than the number of devices that receive data from the first communication unit through the communication bus.

6. The relay device according to claim 5, further comprising:
- a reception unit that receives data from a second device different from the plurality of devices connected to the communication bus,
- wherein the first communication unit and the second communication unit transmit the data received by the reception unit.

7. The relay device according to claim 1, further comprising:
- a reception unit that receives data from a second device different from the plurality of devices connected to the communication bus,
- wherein the first communication unit and the second communication unit transmit the data received by the reception unit.

8. A transmission method for use in a communication system including a plurality of devices, the plurality of devices including a high-performance device and a low-performance device, the high-performance device connected to a relay device by a communication bus and a communication line, the low-performance device connected to the relay device by only the communication bus, relay device, comprising:
- detecting simultaneous transmission of a plurality of data through the communication bus connected to the plurality of devices;
- transmitting data through the communication bus when the number of times of detection of the simultaneous transmission within a predetermined period is less than a predetermined number of times;
- transmitting data to the high-performance device through the communication line when the number of times of detection of the simultaneous transmission along the communication bus within the predetermined period is equal to or greater than the predetermined number of times; and
- stopping transmission of data through the communication bus,
- wherein, when the simultaneous transmission through the communication bus is started, a device as a transmission source of another data excluding one of a plurality of data transmitted simultaneously stops transmission of data,
- in a case where transmission of data transmittable to a transmission destination through the communication line is started so that a plurality of data are transmitted simultaneously through the communication bus, when the plurality of data transmitted simultaneously includes a data, a transmission source of which is a non-connection device, or a data, a transmission destination of which is the non-connection device, the first communication unit stops the transmission of data,
- when a first transmission unit of the relay device stops transmission of data through the communication bus, a second transmission unit of the relay device transmits, through the communication line, data for which the first transmission unit has stopped the transmission, and
- when the number of times by which the first transmission unit has stopped transmitting common data through the communication bus becomes equal to or greater than a second predetermined number of times, the second transmission unit transmits, through the communication line, the common data for which the first transmission unit has stopped the transmission, and the second predetermined number of times is two or more.

9. A computer program product comprising a non-transitory, machine-readable medium storing instructions which, when executed by at least one programmable processor, causes at least one programmable processor to perform operations comprising:

detecting simultaneous transmission of a plurality of data through a communication bus connected to a plurality of devices, the plurality of devices including a high-performance device and a low-performance device, the high-performance device connected to a relay device by a communication bus and a communication line, the low-performance device connected to the relay device only by the communication bus;

giving an instruction to transmit data through the communication bus when the number of times of detection of the simultaneous transmission within a predetermined period is less than a predetermined number of times;

giving an instruction to transmit data to one of the plurality of devices through the communication line when the number of times of detection of the simultaneous transmission along the communication bus within the predetermined period is equal to or greater than the predetermined number of times; and stopping transmission of data through the communication bus, wherein, when the simultaneous transmission through the communication bus is started, a device as a transmission source of another data excluding one of a plurality of data transmitted simultaneously stops transmission of data, in a case where transmission of data transmittable to a transmission destination through the communication line is started so that a plurality of data are transmitted simultaneously through the communication bus, when the plurality of data transmitted simultaneously includes a data, a transmission source of which is a non-connection device, or a data, a transmission destination of which is the non-connection device, the first communication unit stops the transmission of data, when a first transmission unit of the relay device stops transmission of data through the communication bus, a second transmission unit of the relay device transmits, through the communication line, data for which the first transmission unit has stopped the transmission, and when the number of times by which the first transmission unit has stopped transmitting common data through the communication bus becomes equal to or greater than a second predetermined number of times, the second transmission unit transmits, through the communication line, the common data for which the first transmission unit has stopped the transmission, and the second predetermined number of times is two or more.

* * * * *